(12) United States Patent
Kurihara

(10) Patent No.: US 10,118,580 B2
(45) Date of Patent: Nov. 6, 2018

(54) STRUCTURE OF UNDERRUN PROTECTION

(71) Applicant: Daimler AG, Stuttgart (DE)

(72) Inventor: Shigeki Kurihara, Kanagawa (JP)

(73) Assignee: Daimler AG, Stuttgart (DE)

( * ) Notice: Subject to any disclaimer, the term of this patent is extended or adjusted under 35 U.S.C. 154(b) by 344 days.

(21) Appl. No.: 15/100,137

(22) PCT Filed: Nov. 25, 2014

(86) PCT No.: PCT/JP2014/081069
§ 371 (c)(1),
(2) Date: May 27, 2016

(87) PCT Pub. No.: WO2015/080087
PCT Pub. Date: Jun. 4, 2015

(65) Prior Publication Data
US 2018/0178743 A1 Jun. 28, 2018

(30) Foreign Application Priority Data
Nov. 28, 2013 (JP) ................................. 2013-246575

(51) Int. Cl.
*B60R 19/02* (2006.01)
*B60R 19/56* (2006.01)
*B60R 19/18* (2006.01)

(52) U.S. Cl.
CPC ............. *B60R 19/56* (2013.01); *B60R 19/18* (2013.01); *B60R 2019/1826* (2013.01)

(58) Field of Classification Search
CPC ....... B60R 19/023; B60R 19/56; B60R 19/18; B60R 2019/1826
(Continued)

(56) References Cited

U.S. PATENT DOCUMENTS

2009/0102209 A1* 4/2009 Ryden .................... B60R 19/36
293/132
2017/0101070 A1* 4/2017 Wylezinski ............. B60R 19/24

FOREIGN PATENT DOCUMENTS

EP 0 839 690 A2 5/1998
EP 1 972 505 A1 9/2008
(Continued)

OTHER PUBLICATIONS

Japanese Office Action issued in Japanese counterpart application No. 2013-246575 dated Jun. 13, 2017 (Three (3) pages).
(Continued)

*Primary Examiner* — Pinel E Romain
(74) *Attorney, Agent, or Firm* — Crowell & Moring LLP

(57) ABSTRACT

A structure of an underrun protection bound to a plurality of brackets disposed at the front or rear portion of a frame of a vehicle is disclosed. A distal panel being disposed on a distal side of a longitudinal direction of the vehicle is bound to a proximal panel being disposed on a proximal side of the longitudinal direction at engaged overlapping parts each at which an edge of a flange of the distal panel is in contact with an edge of a flange of the proximal panel. A reinforcing panel is disposed at a binder part in a hollow, the underrun protection bound to the plurality of brackets at a plurality of the binder parts such that the reinforcing panel is in contact with the inner face of one of the proximal panel and the distal panel and is in contact with the engaged overlapping part.

6 Claims, 6 Drawing Sheets

(58) Field of Classification Search
 USPC .......................................................... 293/102
 See application file for complete search history.

(56) References Cited

FOREIGN PATENT DOCUMENTS

| | | |
|---|---|---|
| JP | 2003-276536 A | 10/2003 |
| JP | 2004-175228 A | 6/2004 |
| JP | 2004-237878 A | 8/2004 |
| JP | 2008-260448 A | 10/2008 |
| JP | 2009-90796 A | 4/2009 |
| JP | 2009-120095 A | 6/2009 |
| JP | 2010-137678 A | 6/2010 |
| JP | 2012-171390 A | 9/2012 |
| WO | WO 2006/036065 A1 | 4/2006 |

OTHER PUBLICATIONS

European Search Report issued in European counterpart application No. 14865940.2-1503 / 3075608 PCT/JP2014081069 dated Jun. 2, 2017 (Seven (7) pages).
PCT/JP2014/081069, International Search Report dated Feb. 10, 2015 (Two (2) pages).
U.S. Patent Application, "Structure of Underrun Protection", filed May 27, 2016, Inventor: Shigeki Kurihara.

\* cited by examiner

STRUCTURE OF UNDERRUN PROTECTION

TECHNICAL FIELD

The present invention relates to the structure of an underrun protection that inhibits a vehicle shorter in height from running under another vehicle longer in height in the event of collision between vehicles.

BACKGROUND

With the intention of inhibiting a vehicle shorter in height such as a passenger car or a mini-car from running under the front or rear portion of a vehicle longer in height such as a motor truck, a vehicle longer in height equipped with an underrun protection mounted beneath the front or the rear portion of the frame has been put into practical use.

An underrun protection at least requires enough strength and stiffness to inhibit another vehicle from running under the vehicle mounting thereon the underrun protection. Unfortunately, an underrun protection formed of steel, which has been widely used for a vehicle, leads to increase in weight of the vehicle.

With the above problem in view, an underrun protection has been developed which can ensure requisite strength and stiffness, preventing the weight from excessively increasing. For example, the following Patent Literature 1 discloses an underrun protection formed of aluminum. According to the Patent Literature 1, the disclosed underrun protection satisfies requisite strength and stiffness, preventing the weight from excessively increasing.

PRIOR ART REFERENCE

Patent Literature

[Patent Literature 1] Japanese Laid-Open Patent Publication No. 2004475228

SUMMARY

Technical Problems

However, aluminum material is more expensive than steel material. For this reason, although an underrun protection made of aluminum material as disclosed in Patent Literature 1 surely satisfies both requisite strength and stiffness and weight reduction, the production cost will increase.

Ultrahigh tensile strength steel plates, which have been put into market in recent years, are excellent in strength and are less expensive than the aluminum.

Considering the above, ultrahigh tensile strength steel plates are efficiently applied to an underrun protection. In this application, suppressing the thickness of ultrahigh tensile strength steel plates (i.e., using thin plates) can prevent the weight of the underrun protection from increasing.

However, forming an underrun protection using thin steel plates has a possibility of generation of buckling. Buckling tends to be more easily generated when the underrun protection is formed of thin plates irrespective of materials of the plates which are not limited to ultrahigh tensile strength steel plates.

With the foregoing problems in view, one of the objects of the present invention is to provide a structure of an underrun protection that is low in weight and cost and is capable of avoiding generation of buckling.

Solution to Problems (1) In order to attain the above object, there is provided a structure of an underrun protection bound to a plurality of brackets disposed at the front or rear portion of a frame of a vehicle characterized in that: a distal panel being disposed on a distal side of a longitudinal direction of the vehicle and being made of a channel-shaped steel plate is bound to a proximal panel being disposed on a proximal side of the longitudinal direction of the vehicle and being made of a channel-shaped steel plate at engaged overlapping parts each at which an edge of a flange of the distal panel is in contact with an edge of a flange of the proximal panel, the distal panel and the proximal panel forming a hollow having a rectangular closed section defined by a distal face of the longitudinal direction, a proximal face of the longitudinal direction, an upper face, and a lower face; and a reinforcing panel being made of a steel plate is disposed at a binder part in the hollow, the underrun protection being bound to each of the plurality of brackets at a plurality of the binder parts such that the reinforcing panel is in contact with the inner face of one of the proximal panel and the distal panel and is in contact with the engaged overlapping part, so that the structure has a multiplexed panel part formed of three or more overlapping panels.

(2) The upper face and the lower face at the binder part may each have a single panel part formed only of the distal panel or the proximal panel at a portion toward one of the distal side and the proximal side in the longitudinal direction of the vehicle; and the upper face and the lower face may each have an overlapping panel part formed of a plurality of panels toward the other one of the distal side and the proximal side in the longitudinal direction of the vehicle.

(3) The single panel parts may have lengths in the longitudinal direction of the vehicle equal to or shorter than the lengths of the respective overlapping parts.

(4) The reinforcing panel may be connected to the inner face of the proximal panel so as to be in contact with the inner face thereof; each of the reinforcing panel may have a first installation hole and the proximal panel has a second installation hole, the first installation hole overlapping the second installation hole; and a fastening member may fix the reinforcing panel and the proximal panel to the corresponding one of the brackets through the first installation hole and the second installation hole.

(5) The reinforcing panel may have a web and flanges being in contact with an inner face of a web and flanges of the proximal panel, respectively; the distal panel may include flanges extending to reinforcing overlapping parts formed of the flanges of the reinforcing panel and proximal panel that are in contact with each other to form the multiplex panel parts; and the distal panel, the proximal panel and the reinforcing panel may have flanges having length in the longitudinal direction of the vehicle longer in decreasing order of length.

(6) The distal panel, the proximal panel and the reinforcing panels may be made of steel plates being made of the same material and having the same thickness.

Effect of Invention

The structure of the underrun protection of the present invention forms a multiplex panel part formed of three or more overlapping panels by further bringing the reinforcing panel in contact with the overlapping part, which is formed by bringing an edge of the flange of the distal panel in contact with the edge of the flange of the proximal panel.

Even if the distal panel, the proximal panel, and the reinforcing panel are made of thin steel plates, since the multiplex panel part is formed of three or more overlapping panels, the stiffness of the multiplex panel part and the peripheral thereof can be improved, increase in weight and the cost of the underrun protection can be suppressed and also generation of buckling can be inhibited.

DESCRIPTION OF EMBODIMENTS

Figure 1:
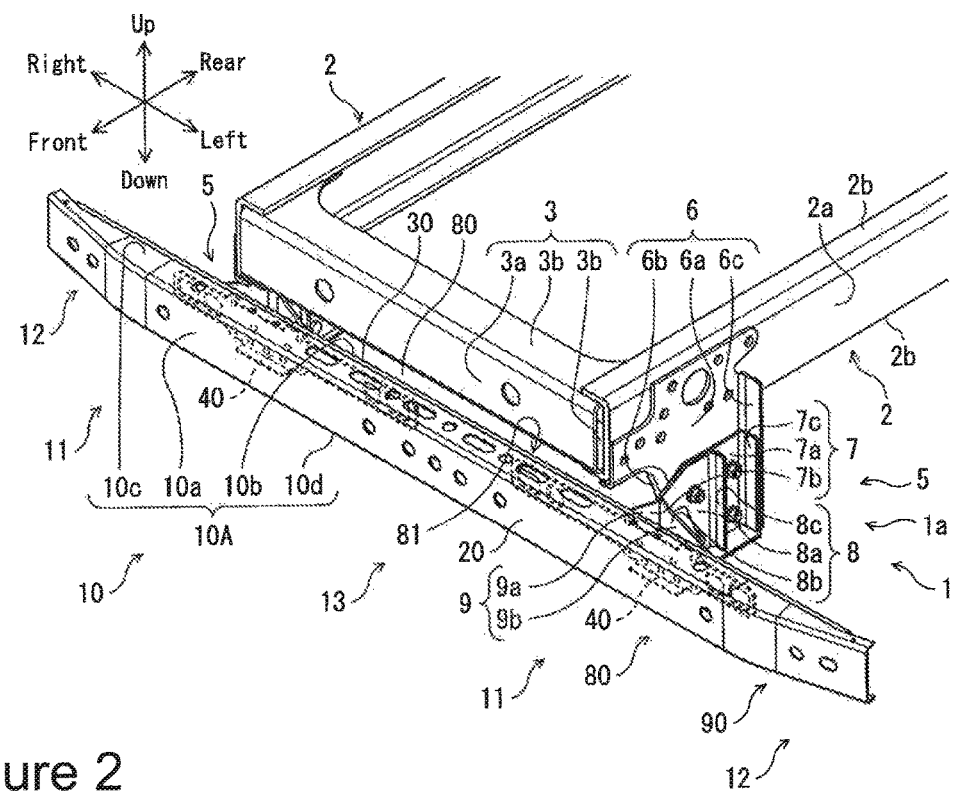
FIG. 1 is a perspective view showing an underrun protection according to a first embodiment of the present invention and the main part of the peripheral structure of the underrun protection.

Hereinafter, description will now be made in relation to embodiments of the present invention with reference to the accompanying drawings.

An underrun protection of the present invention is mounted on the front or rear portion of a vehicle such as a motor truck (hereinafter simply called "vehicle").

An underrun protection mounted on the front portion of a vehicle is also called "front underrun protection" or its abbreviation "FUP", and inhibits another vehicle short in height from running under the front portion of the vehicle equipped with the FUP. Conversely, an underrun protection mounted on the rear portion of a vehicle is also called "rear underrun protection" or its abbreviation "RUP", and inhibits another vehicle short in height from running under the rear portion of the vehicle equipped with the RUP.

A normal front underrun protection is formed to have a shape at the ends in the width direction of the vehicle along with the bumper. Specifically, a FUP has a shape of slightly bending backward as approaching the ends in the width direction. In contrast, a normal rear underrun protection is formed to have a straight line in the width direction of the vehicle.

The description below assumes that: the direction that the vehicle runs is referred to as the "forward" direction; the "left" and the "right" is based on the forward direction; the opposite direction of the forward direction is referred to as the "backward" or "rearward"; "downward" is a direction that the gravity acts; "upward" is the opposite direction to the downward; and a "width direction" is a direction that is perpendicular to both the longitudinal direction and the vertical direction.

A "proximal side" of the vehicle represents a position closer to the center of the vehicle; and a "distal side" represents a position opposite to the proximal side with respect to the center of the vehicle. Accordingly, for a front underrun protection that is mounted to the front portion of a vehicle, the proximal side of the longitudinal direction of the vehicle means a rear portion of the FUP, and the distal side of the longitudinal direction of the vehicle means a front portion of the FUP. For a rear underrun protection that is connected to the rear portion of a vehicle, the proximal side of the longitudinal direction of the vehicle means a front portion of the RUP and the distal side of the longitudinal direction means a rear portion of the RUP.

The wording "inside" and "outside" of an underrun protection simply refer to the inside of a hollow space and the outside of the hollow space, respectively.

Hereinafter, the description to be made assumes that the underrun protection is a front underrun protection mounted to the front portion of the vehicle frame, and the front underrun protection is simply referred to as the "underrun protection".

First Embodiment

1. Structure

Firstly, description will now be made in relation to a peripheral structure of an underrun protection according to the first embodiment.

As shown in FIG. 1, an underrun protection 10 is connected to the lower portion of a front portion 1a of the frame 1 such that the longitudinal side of the underrun protection 10 extends along the width direction of the vehicle. The underrun protection 10 is connected to brackets 5, 5 that are respectively formed on the left and right portions of the front portion 1a of the frame 1.

1-1. Peripheral Structure

Hereinafter, description will now be made in relation to the structure of the frame 1 and the bracket 5 in sequence.

1-1-1. Frame

The frame 1 of the vehicle is a so-called ladder frame, and includes a pair of side frames 2, 2 and a cross member 3.

The side frames 2, 2 are arranged along the longitudinal direction of the vehicle to have a predetermined distance in the width direction therebetween. The side frames 2, 2 are disposed inside of both ends in the width to have a distance shorter than overall width of the vehicle and, wheels and side-body parts, which are not shown in the drawings, are arranged at the outside of the respective side frames 2, 2 in the width direction. The shape and arrangement of side frames 2, 2 are symmetry on the basis of the center line of the width direction. For the above, description to be hereinafter made will focus on one (left) of the side frames 2, 2 and description of the other side frame 2 will be omitted.

Each side frame 2 has a C-shaped, i.e., channel-shaped, vertical section along the width direction. The side frame 2 has a web 2a vertically arranged and flanges 2b, 2b that are bent so as to protrude from the upper and lower ends of the web 1 inwardly along the width direction of the vehicle.

The cross member 3 is arranged along the width direction of the vehicle. Although only one cross member 3 disposed at the front portion 1a of the frame 1 appears in FIG. 1, non-illustrated multiple cross members are disposed along the longitudinal direction at predetermined intervals.

The cross member 3 is formed to have a C-shaped, i.e., channel-shaped, vertical section along the longitudinal direction. The cross member 3 has a web 3a vertically arranged and flanges 3b, 3b formed by bending the upper and lower edges of the web 3a in the same direction. In the illustrated example, the flanges 3b, 3b are formed by bending the edges so as to protrude rearward of the vehicle.

The cross member 3 is bound to the side frames 2, 2 at the both ends of the width direction, so that the cross member 3 connects one side frame 2 to the other side frame 2. Alternatively, a non-illustrated gusset may be interposed between the cross member 3 and each side frame 2, and the cross member 3 and the side frame 2 are engaged with the gusset, so that the cross member 3 may be bound to the two side frames 2, 2 via such gussets. Further alternatively, non-illustrated faces that overlap webs 2a of the respective side frames 2, 2 may be formed on the both ends of the cross member 3 in the width direction of the vehicle, and the faces of the cross member 3 may be engaged with the webs 2a of the respective side frames 2, 2.

Various driving components, such as an engine and a transmission, a cab, a carrier, and various accessories, all of which do not appear in the drawings, are installed to and supported by the frame 1 which is collectively configured by the side frames 2, 2 and the cross member 3. For the purpose of installing heavy components, the side frames 2, 2 and the cross member 3 have sufficient strength and stiffness.

1-1-2. Brackets

A pair of brackets 5, 5 are disposed at the left and right portions to install the underrun protection 10 to the frame 1, and are specifically bound to the front portion 1a of the frame 1. In detail, the left bracket 5 is installed to the front portion of the side frame 2 disposed on left while the right bracket 5 is installed to the front portion of the side frame 2 disposed on right. The underrun protection 10 is supported at the portions (in the illustrated example, two portions) corresponding to the brackets 5, 5 having a predetermined distance in the width direction of the vehicle. The brackets 5, 5 have the symmetric arrangement and the symmetric shape with reference to the center of the width direction.

The brackets 5, 5 are arranged downward of the frame 1 (in this example, the side frames 2, 2) so that the underrun protection 10 is arranged at the lower position than the frame 1. Since the underrun protection 10 needs to endure load applied backward to the front of the vehicle, the underrun protection 10 is bound to the front portions of the brackets 5, 5, which thereby support the underrun protection 10 from behind.

Various structures can be applied to the brackets 5, 5, but the first embodiment selects the following structure for the brackets 5, 5. Here, description will now be made, focusing on one of the brackets 5, 5 (i.e., the left bracket 5 in FIG. 1).

The bracket 5 includes a first panel 6, a second panel 7, and a third panel 8 from the inside to the outside along the width direction of the vehicle.

The first panel 6 is arranged along the outer face of the web 2a, which is included in the corresponding side frame 2 and which is extending along the vertical direction and the longitudinal direction of the vehicle. The first panel 6 is formed of a main body 6a in the form of a flat plate to be engaged with the web 2a of the side frame 2, a reinforcing flange 6b formed by bending the front edge of the main body 6a, and another reinforcing flange 6c formed by bending the rear edge of the main body 6a.

The upper portion of the main body 6a of the first panel 6 is engaged with the web 2a of the side frame 2 while the lower portion of the main body 6a is overlapped and engaged with the second panel 7 and the third panel 8, keeping in contact with one another. In this example, the front-edge reinforcing flange 6b is formed by bending the front portion of the main body 6a inwardly along the width direction of the vehicle and the rear-edge reinforcing flange 6c is formed by bending the rear portion of the main body 6a from the upper end to the lower end of the main body 6a outwardly along the width direction of the vehicle.

The second panel 7 and the third panel 8 respectively include main bodies 7a and 8a, which are, in this sequence, to overlap and be engaged with the lower portion of the outer face of the main body 6a in the order. An installation portion 7b is formed at the front edge of the second panel 7 and includes an installation face 9a extending toward the inside of the width direction of the vehicle and along the lateral and the vertical directions. Likewise, an installation portion 8b is formed at the front edge of the third panel 8 and includes an installation face 9b extending toward the outside of the width direction of the vehicle and along the lateral and the vertical directions.

The installation faces 9a and 9b (hereinafter collectively referred to as "installation face 9") of the installation portion 7b and 8b are flush with each other, and are overlapped with and bound to the back face (corresponding to a rear face 10b of the main body 10A of underrun protection 10 that will be detailed below) of the underrun protection 10.

At the rear edges of the second panel 7 and the third panel 8, reinforcing flanges 7c and 8c are formed by bending the corresponding portions outwardly along the width direction of the vehicle.

The respective components and parts, such as the side frames 2, the cross member 3, and the brackets 5 can be bound to each other by various known method of binding, such as welding bind including plug welding and fillet welding, or fastening with rivets, and bolts and nuts.

1-2. Underrun Protection

Next, description will now be made in relation to the structure of the underrun protection 10.

Figure 2:
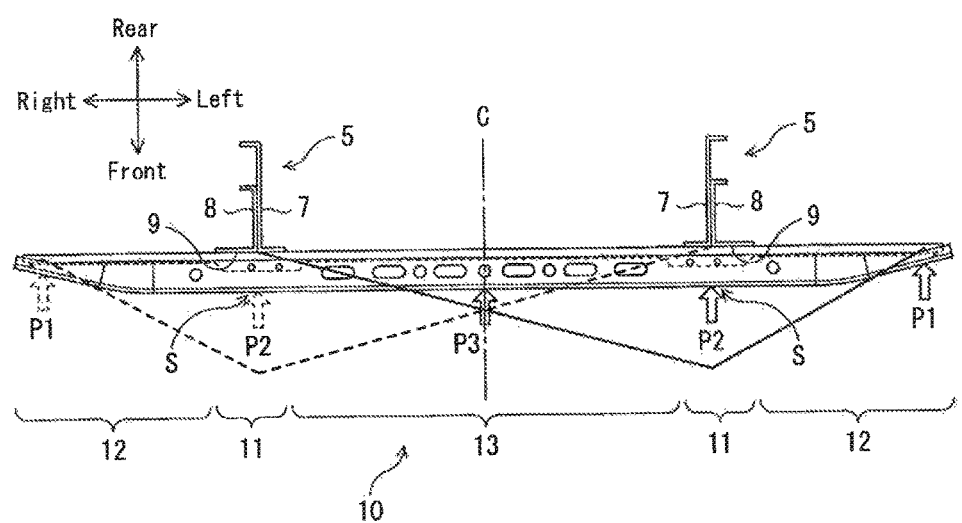
FIG. 2 is a top view of an underrun protection of the first embodiment, overlapping the largeness of the bending moment acting on the underrun protection.

The underrun protection 10 is arranged to across the entirety of the width direction of the vehicle. As illustrated in FIGS. 1 and 2, the underrun protection 10 has parts 11, 11 (hereinafter referred to as "binder parts 11, 11) between the middle part of a extending direction of the underrun protection 10 (i.e., the width direction of the vehicle) and each edge, which parts are bound to the respective brackets 5, 5 (only the second and third panels 7 and 8 appear in FIG. 2, which omits illustration of the first panel 6). In addition to the two binder parts 11, 11, the underrun protection 10 is divided into multiple parts of: edge parts 12 outside the respective binder parts 11, 11 in the width direction of the vehicle; and a middle part 13 between the binder parts 11, 11 and inside the binder parts 11, 11 in the width direction of the vehicle.

Namely, the underrun protection 10 is formed of five parts, arranged from one end to the other end of the lateral direction, in the order of the edge part 12, the binder part 11, the middle part 13, the binder part 11, and the edge part 12.

The binder parts 11, 11 are defined outside the middle part 13 in the width direction of the vehicle and are bound to the respective brackets 5, 5, so that the middle part 13 has a structure of a both-end-supported beam. In contrast, the binder parts 11, 11 are defined at the inside of the respective edge parts 12, 12, so that the edge parts 12 each have a structure of cantilevered.

For example, loads P1, P2, and P3 shown in FIG. 2 that have been taught to be used in tests for security standard can be applied to the standard measurement of the strength and the stiffness that the underrun protection 10 requires. Specifically, the loads P1, P2, and P3 are input into the underrun protection 10, and if the underrun protection 10 successfully endures the loads P1, P2, and P3, the underrun protection 10 satisfies the required strength and stiffness.

The loads P1, P2, and P3 are input into the underrun protection 10 at the respective corresponding positions in the width direction of the vehicle as illustrated in FIG. 2 from the ahead of the underrun protection 10 in the longitudinal direction and the horizontal direction.

The load P1 is input into each edge part 12. Here, the load P1 is assumed to be input at a point which is inwardly distant from the end of the underrun protection 10 by a predetermined length within each edge part 12.

The load P2 is input into each binder part 11. Here, the load P2 is assumed to be input into an installing point S on the underrun protection 10 where the corresponding bracket 5 is connected. In the illustrated example, the installing point S corresponds to an engaging face at which the first panel 6 (see FIG. 1) is engaged with the second panel 7 in the bracket 5, that is, the center (face center) of the installation face 9 of the bracket 5 along the width direction of the vehicle.

The load P3 is input to the center of the middle part 13. Specifically, the load P3 is input to the middle part 13 at the center along the lateral direction, i.e., at the center C of the underrun protection 10 along the width direction of the vehicle.

The loads P1, P2 and P3 can be determined in accordance with the legal safety standard of each country. If these loads P1, P2 and P3 are planarly input, the face centers can be regarded as the respective input point.

As the above, the load P2 is input into each binder part 11, which is supported by the corresponding bracket 5, while the loads P1 and P3 are input into the edge parts 12 and the middle part 13, which have beam structures based on the bracket 5. Thereby, a bending moment caused from the loads P1 and P3 acts on the underrun protection 10.

The largeness of the bending moment depends not only on the loads to be input but also on the supporting manner of the beam structures, the distances from the input points (where force is applied) of the loads, and the distance from fulcrums of the beam structures (in this embodiment, corresponding to the distances from the installing points S of the respective brackets 5). Since each load P1 is applied to the free end of the cantilever, a remarkably large bending moment acts on the fulcrum (i.e., each binder part 11). Meanwhile, since the load P3 is applied to the center of the both-end-supported beam structure, the bending moment acting on the input point of the load P3 is opposite in direction to the bending moments acting on the fulcrum of the load P3 so that the bending moment at the input point and the both fulcrums are kept to be lower than that acting on the fulcrum by the load P1.

Accordingly, it is important for the underrun protection 10 to compete against the bending moment caused by the load P1. Therefore, description will now focus on the bending moment caused by the load P1 input into the edge part 12 having a cantilever structure.

As illustrated by the thick solid lines in FIG. 2, input of the load P1 into the left edge part 12 (i.e., the edge part 12 on the left in the width direction of the vehicle, hereinafter simply called "left" edge part 12) generates a bending moment having a largeness depending on the distance between the installing point S of the bracket 5 to the left binder part 11 and the input point of the load P1.

Accordingly, when the load P1 is input into the left edge part 12, the largest bending moment acts on the installing point S of the left bracket 5. In other words, the largeness of the bending moment resulting from input of the load P1 linearly increases from the input point of the P1 to the installing point S of the left bracket 5. This means that a required second moment of area in the edge part 12 (here, the left edge part 12) increases as inwardly approaching the underrun protection 10 along the width direction of the vehicle.

Likewise, as illustrated by the thick broken line in FIG. 2, the largeness of the bending moment resulting from input of the load P1 input into the other edge part 12 on the right of the vehicle (hereinafter simply called the "right" edge part 12) linearly increases from the input point of the P1 to the installing point S of the right bracket 5.

Since the middle part 13 of the underrun protection 10 has a structure of a both-end-supported beam in which the binder parts 11, 11 are bound to and supported by the respective brackets 5, 5, the largeness of the bending moment caused by the load P1 input into the left edge part 12 linearly decreases in the direction from the installing point S of the left bracket 5 to the installing point S of the right bracket 5, as shown by the thick solid line in FIG. 2. In contrast, as illustrated by the thick broken line in FIG. 2, the largeness of the bending moment caused by the load P1 input into the right edge part 12 linearly decreases within the middle part 13 in the direction from the installing point S of the right bracket 5 to the installing point S of the left bracket 5.

In the event of offset collision of the vehicle equipped with the underrun protection 10 with a vehicle short in height, load is input into either one of the left and right edges of the underrun protection 10. Accordingly, the underrun protection 10 requires a stiffness that can compete a load input into either one of the left side and the right side of the vehicle. In other words, the middle part 13 of the underrun protection 10 requires a stiffness that can compete a larger one of the bending moment caused by inputting the load P1 into the left edge part 12 and the bending moment caused by inputting the load P1 into the right edge part 12. In the middle part 13 of the underrun protection 10, the largeness of a required second moment of area decreases in the direction from the installing point S of each bracket 5 to the center C of the width direction of the vehicle.

Hereinafter, description will now be made in relation to each component of the underrun protection 10.

Since the underrun protection 10 here is a front underrun protection, the distal side of the longitudinal direction of the vehicle is front or forward side of the vehicle while the proximal side of the longitudinal direction of the vehicle is a rear side or rearward of the vehicle.

As illustrated in FIG. 1, the underrun protection 10 includes a main body 10A, and reinforcing panels 40, 40 (both shown by broken lines) that reinforce the main body 10A. At the both ends along the extending direction of the underrun protection 10, non-illustrated caps may be arranged to cover the both ends.

The main body 10A includes a front face (distal face along the longitudinal direction of the vehicle) 10a, a rear face (proximal face along the longitudinal direction of the vehicle) 10b, an upper face 10c, and a lower face portion 10d. These four faces 10a, 10b, 10c, and 10d collectively form a hollow space. In other words, the main body 10A forms the hollow having a rectangular closed section defined by the four faces 10a, 10b, 10c, and 10d. The faces 10a, 10b, 10c, and 10d of the main body 10A correspond to the respective faces of the underrun protection 10.

The main body 10A extends along the extending direction of the underrun protection 10, and is formed of a distal panel 20 and a proximal panel 30 arranged. This means that the main body 10A is formed by binding the distal panel 20 arranged at the distal side of the vehicle with the proximal panel 30 arranged at the proximal side of the vehicle.

Reinforcing panels 40, 40 reinforce the main body 10A. The reinforcing panels 40, 40 are symmetrically arranged and shaped along the width direction of the vehicle with respect to the center line of the width direction. For the above, the description that would be hereinafter made focuses on one (left) reinforcing panel 40, and description of the other 40 will be omitted here.

Focusing on the extending direction of the underrun protection 10, the reinforcing panel 40 is arranged so as to extend from the edge part 12 on the side of the binder part 11 to the middle part 13 on the side of the same binder part 11 as to be detailed below. Namely, the reinforcing panel 40 overlaps the entirety of the binder part 11 and has the both ends overlapping portions of the edge part 12 and the middle part 13.

The reinforcing panel 40 is arranged so as to be in contact with the inner face of the rear face 10b inside the hollow of the main body 10A.

In the underrun protection 10, a multiplexed panel part 80 (partially appearing in FIG. 1) represents a part having a cross section being a part (see, FIG. 6, hereinafter called a "reinforcing overlapping part") 81 at which the main body 10A is in contact with the reinforcing panel 40 along the extending direction of the underrun protection 10 (i.e., the width direction of the vehicle). In contrast, a part at which the reinforcing panel 40 is not in contact with the main body 10A and which therefore has a cross section formed only of the main body 10A because the reinforcing panel 40 does not overlap is called simplex body part 90 (partially appearing in FIG. 1).

These panels 20, 30, and 40 are made of ultrahigh tensile strength steel plates, which are defined to have a tensile strength of 980 MPa or more in the illustrated example. Examples of the ultrahigh tensile strength steel include a solute strengthening steel plate or a precipitation hardening stainless steel plate strengthened by adding an element such as nickel (Ni), silicon (Si), or manganese (Mn) along with carbon (C) into steel material, and a dual phase steel plate strengthened by quenching after stamping. The commodity products of ultrahigh tensile strength steel plates have a tensile strength of 980 MPa, 1.2 GPa, or 1.5 GPa.

In this example, the panels 20, 30, and 40 are formed of so-called 980 type (having a tensile strength of 980 MPa). An ultrahigh tensile strength steel plate having a thickness of 3.2 mm can be used here. This means that the panels 20, 30, and 40 can be formed of the same ultrahigh tensile strength steel plates (the same material) having the same thickness.

The panels 20, 30, and 40 constituting the underrun protection 10 may be formed by stamping.

Hereinafter, description will now be made in relation to, in sequence, the distal panel 20, the proximal panel 30, and the reinforcing panel 40.

1-2-1. Distal Panel

Figure 3:
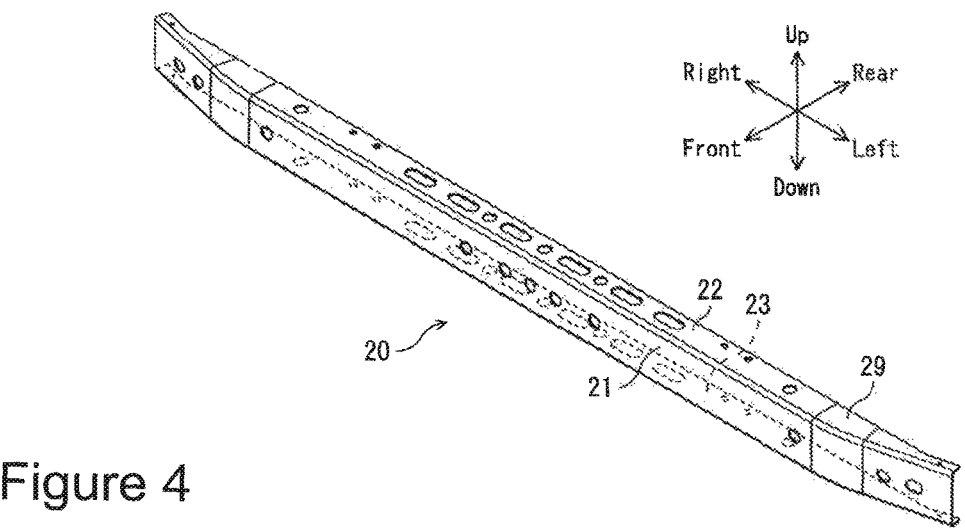
FIG. 3 is a perspective view solely showing a distal panel of an underrun protection of the first embodiment.

As shown in FIG. 3, the distal panel 20 is formed to have a C-shaped section, that is, a channel-shaped section (i.e., the cross section orthogonal to the extending direction of the underrun protection 10). Accordingly, the distal panel 20 includes a vertical web 21 and flanges 22 and 23 formed by bending the upper edge and the lower edge of the web 21 in the same direction so as to protrude rearward in the vehicle. Namely, the distal panel 20 has the web 21 arranged at the distal side of the vehicle and the flanges 22 and 23 arranged to protrude rearward in the vehicle. Besides, the distal panel 20 includes edge bents 29 formed at the both edge portions of the extending direction of the panel 20 by bending the edge portions toward the proximal panel 30 (see FIG. 1). In FIG. 3, the reference number is attached to only one of the edge bents 29.

The web 21 of the distal panel 20 extends along the width direction of the vehicle and is arranged vertically.

The flanges 22 and 23 extend along the width direction and are arranged horizontally. The structure of the flanges 22 and 23 are the same except that the flange 22 is connected to the upper edge of the web 21 while the flange 23 is connected to the lower edge of the web 21. Considering above, the one flange 22 (the upper one of the flanges 22 and 23) will now be detailed.

Figure 4:
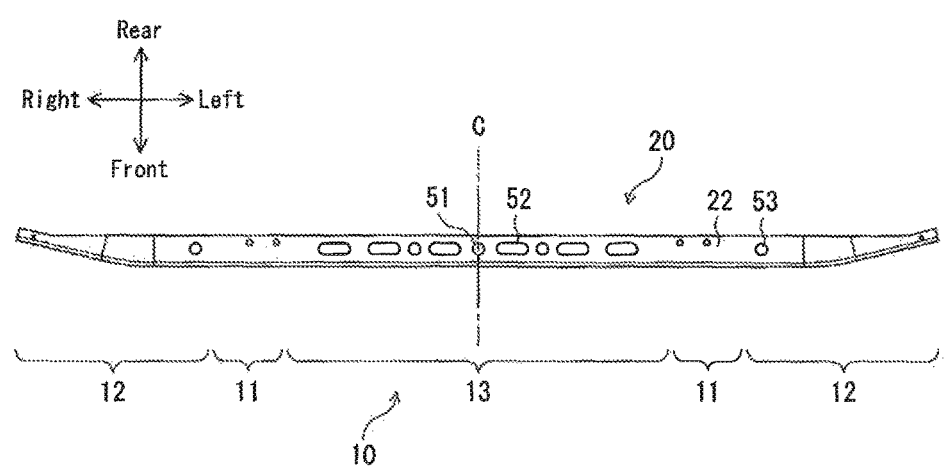
FIG. 4 is a top view solely showing a distal panel of an underrun protection of the first embodiment.

As illustrated in FIG. 4, multiple lightening holes 51, 52, and 53 are formed on the flange 22 of the distal panel 20. Likewise, the lightening holes are formed on the other flange 23 (see FIG. 3) at the corresponding points as those on the flange 22. Namely, the flange 22 has the lightening holes at the same horizontal positions as those formed on the other flange 23.

The flanges 22 and 23 of the distal panel 20 each extend to a position including a lightening hole forming part 96 that covers a middle portion of the underrun protection 10 along the longitudinal direction of the vehicle and that includes an equidistance portion 95 having the same distance from the front face 10a and the rear face 10b of the underrun protection 10. The equidistance portion 95 and the lightening hole forming part 96 are shown in FIG. 6B.

Among the multiple lightening holes 51, 52, and 53, the middle lightening holes 51 and 52 (in FIG. 4, reference numbers 51 and 52 are each attached to one of the holes) formed in the middle part 13 are discriminated from the edge lightening hole 53 formed in edge part 12. Furthermore, the middle lightening holes 51 and 52 can be classified into lightening holes (hereinafter called circular middle lightening holes) 51 each having a circular opening when seen from the top and lightening holes (hereinafter called oval middle lightening holes) 52 each having an oval opening when seen from the top. The oval middle lightening holes 52 shown in FIG. 4 are each defined by two parallel lines extending along the lateral direction of the distal panel 20 and arcs that connects the front ends of the two lines with the rear ends of the two lines, but alternatively, each oval middle lightening hole 52 may have an ellipse shape having the major axis along the extending direction of the underrun protection 10.

Each circular middle lightening hole 51 has a diameter of the extending direction of the underrun protection 10 different from a diameter of oval middle lightening hole 52 of the lateral direction, but the diameter of the minor axis (along the longitudinal direction of the vehicle) of the oval middle lightening holes 52 are set to be the same as the diameters of the circular middle lightening holes 51. The middle lightening holes 51 and 52 are formed to be horizontally symmetric.

In FIG. 4, the center of the extending direction of the underrun protection 10 (i.e., the center C of the width direction of the vehicle) and one of circular middle lightening holes 51 are concentrically arranged, and in the direction from the concentric circular middle lightening hole 51 to the both ends of the width direction of the vehicle, an oval middle lightening hole 52, a circular middle lightening hole 51, an oval middle lightening hole 52, and an oval middle lightening hole 52 are arranged in this order. However, arrangement of the circular middle lightening holes 51 and the oval middle lightening holes 52 are not limited to the above, and various arrangements can be adopted.

The middle lightening holes 51 and 52 may be arranged at constant intervals or may be arranged such that the intervals come to be longer as approaching, from the center C, the ends along the width direction of the vehicle.

Furthermore, the circles, the ovals, and the ellipses of the middle lightening holes 51 and 52 are examples of the top views thereof and alternatively the middle lightening holes 51 and 52 may have arbitrary top views. For example, the middle lightening holes may be set to have different diameters of the extending direction of the underrun protection 10 that come to be large as approaching, from the center C, the ends along the width direction of the vehicle. Also in this case, the middle lightening holes may be arranged at constant intervals or may be arranged such that the intervals come to be longer as approaching, from the center C, the ends of the width direction of the vehicle.

In contrast, all the middle lightening holes may be formed to have the same shape. Also in this case, the middle lightening holes may be arranged at constant intervals or may be arranged such that the intervals come to be longer as approaching, from the center C, the ends of the width direction of the vehicle.

FIG. 4 illustrates each binder part 11 forming thereon two holes, which are to be used for plug welding to engage the distal panel 20 with the proximal panel 30.

Each edge lightening hole 53 of the first embodiment is formed to have a circular top view as with the circular middle lightening hole 51. The edge lightening hole 53 is formed within the edge part 12 and is in vicinity of the binder part 11. The edge lightening hole 53 may have a different top view from a circle and may be omitted to simplify the structure.

1-2-2. Proximal Panel

Figure 5:
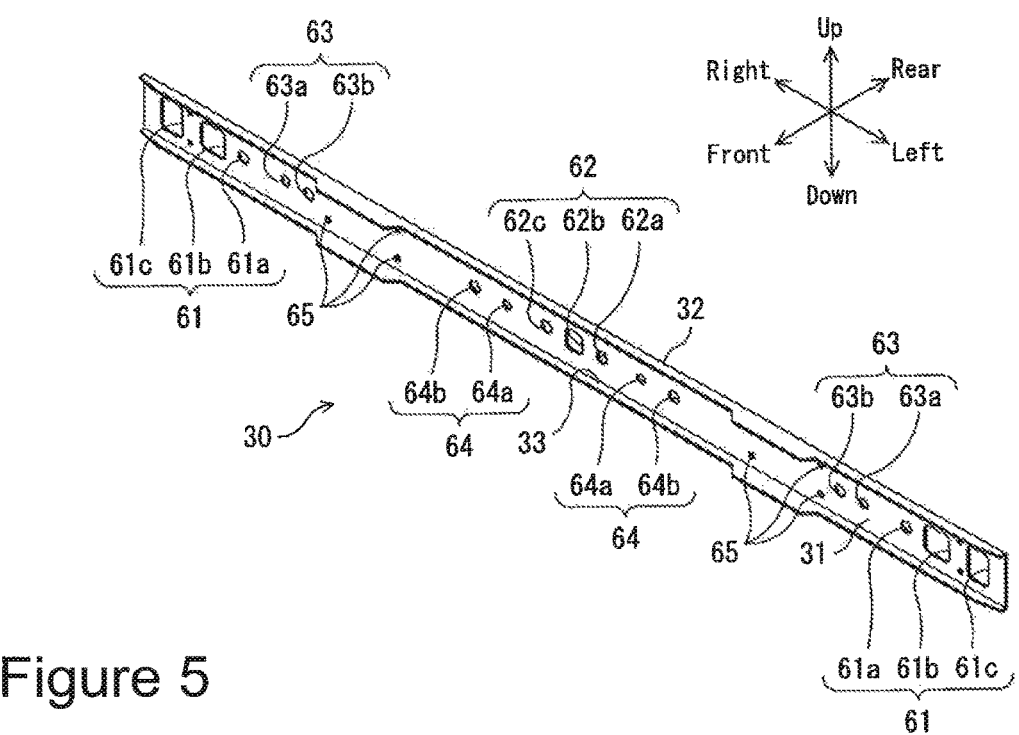
FIG. 5 is a perspective view solely showing a proximal panel of an underrun protection of the first embodiment.

As shown in FIG. 5, the proximal panel 30 is formed to have a C-shaped section, that is, a channel-shaped section (i.e., the cross section orthogonal to the extending direction of the underrun protection 10). Accordingly, the proximal panel 30 includes a vertically-arranged web 31 and flanges 32 and 33 formed by bending the upper edge and the lower edge of the web 31 in the same direction so as to protrude forward in the vehicle. Namely, the proximal panel 30 has the web 31 arranged at the proximal side of the vehicle and the edges of the flanges 32 and 33 arranged to protrude forward in the vehicle. The proximal panel 30 is formed to have a uniform cross section along the extending direction of the underrun protection 10.

The web 31 extends along the width direction of the vehicle and is arranged vertically.

The flanges 32 and 33 extend along the width direction and are arranged horizontally. The structure of the flanges 32 and 33 is the same except that the flange 32 is connected to the upper edge of the web 31 while the flange 33 is connected to the lower edge of the web 31.

Figure 7:
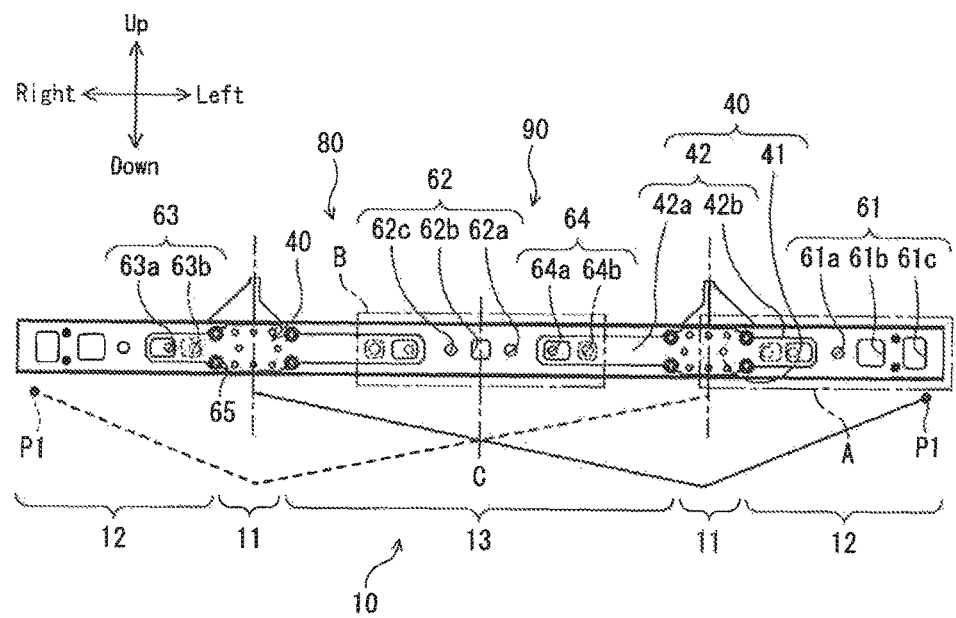
FIG. 7 is a front view of an underrun protection of the first embodiment, removing a distal panel, also showing a bending moment acting on the underrun protection.

As shown in FIGS. 5 and 7, multiple holes 61-65 are formed on the web 31 of the proximal panel 30 along the extending direction of the underrun protection 10. The multiple holes 61-65 are classified into lightening holes 61-64 for lightening the underrun protection 10 and binding holes 65 that are used for binding elements through fastening. The reference number 65 indicating a binding hole is applied to a single binding hole in FIG. 7. The lightening holes 61 and 62 are, as shown in FIG. 7, formed on the simplex body part 90 (partially appears in FIG. 7). Multiple edge lightening holes 61 are formed on the web 31 of the proximal panel 30 in the respective edge parts 12 and multiple middle lightening holes 62 are formed on the web 31 of the proximal panel 30 in the middle part 13. As shown in FIG. 7, the lightening holes 63 and 64 and the binding holes 65 (see FIG. 5) are formed on the multiplexed panel part 80 (partially appears in FIG. 7).

First of all, description will now be made in relation to the edge lightening holes 61 formed on the simplex body part 90.

As illustrated in FIG. 7, multiple (three in this example) edge lightening holes 61 are formed in each edge part 12. Here, the three edge lightening holes 61 on the edge part 12 are referred to as a first edge lightening hole 61a, a second edge lightening hole 61b, and a third edge lightening hole 61c that are sequentially arranged from the inside to the outside along the width direction of the vehicle. The edge lightening holes 61a, 61b, and 61c are arranged on the simplex body part 90 outside the reinforcing panel 40 in the width direction of the vehicle and have respective centers positioned at the center of the web 31 of the proximal panel 30 along the vertical direction.

Figure 8:
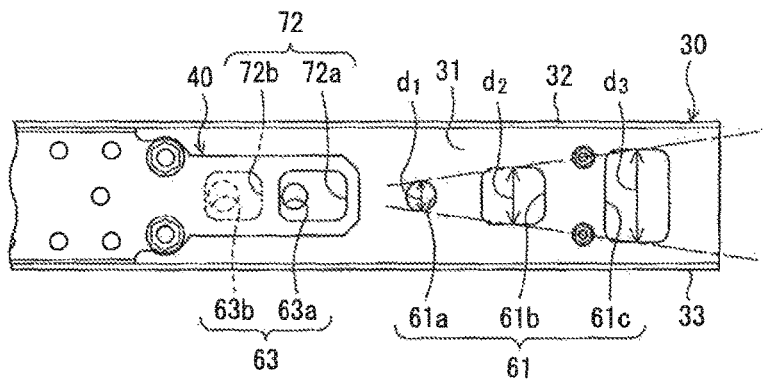
FIG. 8 is a front view illustrating the main part of an underrun protection of the first embodiment removing distal panel, enlarging the edge in the width direction and the peripheral part thereof.

FIG. 8 is an enlarged view of Part A of FIG. 7 and specifically shows the edge and the peripheral of the edge of the underrun protection 10 along the width direction of the vehicle from which the distal panel 20 is detached. As shown in FIG. 8, among edge lightening holes 61 formed on the simplex body part 90 in one (here left) edge part 12, the first edge lightening hole 61a is a circular hole having a circular front view, the second edge lightening hole 61b and the third edge lightening hole 61c are both rectangular holes each having a rectangular front view. Bolts for connecting a non-illustrated bumper of the cab is arranged between the second and third edge lightening holes 61b and 61c.

The edge lightening holes 61 are set to have larger hole diameters along the vertical direction as departing from the respective binder parts 11. In this example, the hole diameters along the vertical direction of the edge lightening holes 61 come to be larger in the order of the first edge lightening hole 61a, the second edge lightening hole 61b, and the third edge lightening hole 61c.

The hole diameters along the vertical direction of the edge lightening holes 61 are set to be able to compete against the distribution of the bending moment being caused by the load P1 on the underrun protection 10. As detailed above, the largeness of the bending moment being caused by the load P1 and acting on the underrun protection 10 linearly decreases in the direction from the fulcrum (here, the installing point S of the corresponding bracket 5) at the inner part along the width direction to the input point of the load P1 (see FIGS. 2 and 7). For the above, the underrun protection 10 requires bending stiffness that linearly decreases as coming from the installing point S, serving as a fulcrum, closer to the input point of the load P1.

In order to satisfy the linear change of the required bending stiffness, the edge lightening holes 61a, 61b, and 61c are set to have the respective hole diameters $d_1$, $d_2$, and $d_3$ of the vertical direction that substantially linearly increase as approaching, from the inner side of the vehicle, the input point of the load P1. The hole diameters $d_1$, $d_2$, and $d_3$ here correspond to the vertical diameters of the edge lightening holes 61a-61c at centers of the respective holes of the width direction. Accordingly, the lines connecting the top ends and the bottom ends of the holes defining the respective hole diameters in the vertical direction are substantial straight lines as one-dot broken lines show in FIG. 8. The second moment of area at a portion where the edge lightening holes 61a, 61b, and 61c are formed of in each edge part 12 of the underrun protection 10 at which parts decreases as approaching, from the inner side of the vehicle, the input point of the load P1, and satisfies the requisite bending stiffness.

Next, description will now be made in relation to the middle lightening holes 62 formed on the simplex body part 90.

As illustrated in FIG. 7, multiple (three in this example) middle lightening holes 62 are formed in the middle part 13. In this example, the three middle lightening holes 62 are referred to as a first middle lightening hole 62a, a second middle lightening hole 62b, and a third middle lightening hole 62c from the left to the right along the width direction of the vehicle. These middle lightening holes 62a, 62b, and 62c are horizontally arranged along the lateral direction at the middle portion between the binder parts 11, 11 and are arranged on the simplex body part 90 arranged at an inner part of the two reinforcing panels 40, 40 such that the centers of the respective holes 62a-62c are arranged at the vertical middle points of the web 31 of the proximal panel 30.

Figure 9:
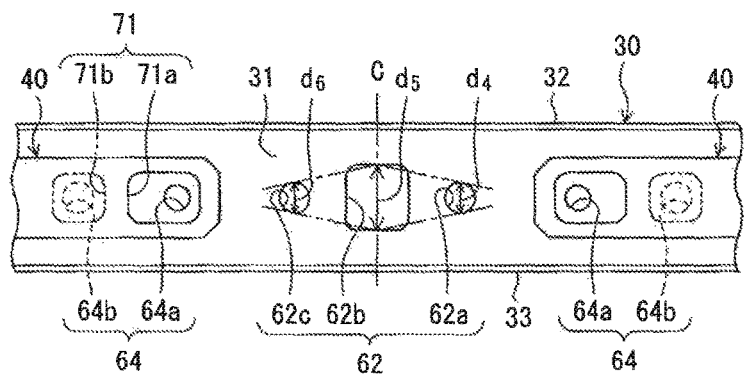
FIG. 9 is a front view illustrating the main part of an underrun protection of the first embodiment removing distal panel, enlarging the center in the width direction and the peripheral part thereof.

FIG. 9 is an enlarged view of the part B of FIG. 7, illustrating the center of the underrun protection 10 and the peripheral part of the center along the width direction of the vehicle from which the distal panel 20 is removed. As illustrated in FIG. 9, the second middle lightening hole 62b is a rectangular hole having a rectangular front view and is arranged at the center C of the width direction of the vehicle. The first middle lightening hole 62a and the third middle lightening hole 62c are circular holes each having a circle front view. The opening area of the first middle lightening hole 62a is the same as that of the third middle lightening hole 62c and the both holes 62a and 62c are equally distant from the first (sic: second) middle lightening hole 62b.

The middle lightening holes 62 are set to have larger hole diameter of the vertical direction as departing farther from the binder parts 11. This means that the second middle lightening hole 62b disposed at the centers of the width direction of the vehicle has a smaller (sic: larger) hole diameter in the vertical direction than those of the first middle lightening hole 62a and the third middle lightening hole 62b adjacent to the binder parts 11, 11.

The hole diameters of the middle lightening holes 62 in the vertical direction are set so as to compete against the distribution of the bending moment caused by the load P1 on the underrun protection 10. As described above with reference to FIGS. 2 and 7, the largeness of the bending moment that is caused by the load P1 and that acts on the underrun protection 10 linearly decreases in the middle part 13 as approaching the center C of the width direction of the vehicle from the fulcrum (here, the installing point S of the bracket 5) at the inner side of the vehicle. For the above, the underrun protection 10 requires bending stiffness that linearly decreases as approaching the center C of the width direction from the installing point S, serving as a fulcrum.

In order to satisfy the linear change of the required bending stiffness, the middle lightening holes 62a, 62b, and 62c are set to have the respective hole diameters $d_4$, $d_5$, and $d_5$ of the vertical direction that substantially linearly increase as approaching, from the installing point S, the center C of the width direction of the vehicle. The hole diameters $d_4$, $d_5$, and $d_6$ here correspond to the vertical diameters of the middle lightening holes 62a-62c at centers of the respective holes of the width direction. Accordingly, the lines connecting the top ends and the bottom ends of the circles defining the respective hole diameters in the vertical direction are lines each bending at the center C of the width direction of the vehicle as one-dot broken lines show in FIG. 9. The second moment of area at a portion where in the middle lightening holes 62a, 62b, and 62c are formed in the middle part 13 of the underrun protection 10 decreases as approaching, from the installing point S, the center C of the width direction, and satisfies the requisite bending stiffness.

The second moment of area of the underrun protection 10 influences not only the web 31 of the proximal panel 30 but also the flanges 32 and 33 of the proximal panel 30, and the web 21 and the flanges 22 and 23 of the distal panel 20, and the reinforcing panels 40, 40. It is effective that the hole diameters of the lightening holes 61a-61c and 62a-62c of the vertical direction are set, considering the influence on the second moment of area on these elements of the underrun protection 10.

The hole diameters of the lightening holes 61a-61c and 62a-62c of the width direction of the vehicle do not much affect the bending stiffness to compete against the horizontal loads P1, P2, and P3. However, external force to be applied to the underrun protection 10 contains both a horizontal and a vertical components, and also even the application of the horizontal loads P1, P2, and P3 generates loads of the vertical components when the underrun protection 10 deforms. Considering the above, the hole diameters of the lightening holes 61a-61c and 62a-62c in the width direction of the vehicle are also limited.

Considering three-dimensional stiffness to compete against a load having a vertical component, the lightening holes 61a-61c and 62a-62c are necessary to be omitted in vicinity of the bent portion serving as connection between the web 31 and the flanges 32 and 33 of the proximal panel 30. It is effective that the arrangement, the sizes, and the shapes of the lightening holes 61a-61c and 62a-62c are set, totally considering the above.

In the illustrated example, the lightening holes 61b, 61c, and 62b are set to be rectangular holes because a rectangular hole can more easily achieve the above requisite bending stiffness, can have a longer distance from the bent portion connected to the flanges 22 and 23, and can have a large opening area as compared with a circular hole. In the illustrated example, the corners of a rectangular hole are curved into arc shapes to avoid concentration of stress thereon.

Comparing a circle hole with a rectangular (square) hole which holes having the same hole diameter in the vertical direction, the rectangular hole has a larger opening area than the circle hole. For the above, if the lightening holes 61-64 are formed into rectangular shape holes, the underrun protection 10 can be lighter in weight as compared with circle lightening holes having the same vertical hole diameters as those of the rectangular holes.

On the other hand, if the lightening holes 61-64 are formed into circle holes, the vertical lengths of the holes gently change along the width direction of the vehicle, so that the second moment of area along the extending direction of the underrun protection 10 is avoided from sharply changing. For the above, the lightening holes 61-64 formed into circles can prevent the strength or the stiffness of the underrun protection 10 from locally lowering.

Next, the lightening holes 63 and 64 formed on the proximal panel 30 of the multiplexed panel part 80 will now be detailed.

As illustrated in FIG. 7, in each edge part 12, multiple (two in this example) lightening holes 63 are formed on the multiplexed panel part 80, at which an extending part 42 of the reinforcing panel 40 that is to be described below is in contact with the proximal panel 30. In the middle part 13, multiple (four in total in this example) lightening holes 64 are formed on the multiplexed panel parts 80 at which the extending parts 42 of the respective reinforcing panels 40 to be detailed below is in contact with the proximal panel 30. Namely, two lightening holes 64 are formed on each of the multiplexed panel parts 80 disposed at the left and the right in the middle part 13. The lightening holes 63 and 64 are formed at a positions overlapping in the longitudinal direction with the reinforcing panels 40, 40 that constitute the respective multiplexed panel parts 80.

As illustrated in FIG. 8 in each edge part 12, the lightening holes 63 are formed inner side of the edge lightening hole 61 and are laterally arranged. One lightening hole 63a has a smaller hole diameter of the vertical direction than the other lightening hole 63b formed closer to the adjacent binder part 11 (i.e., on the inner side along the width direction of the vehicle). For the above, considering the proximal panel 30 alone, a portion of the lightening hole 63b closer to the binder part 11 has smaller bending stiffness than that of the lightening hole 63a further from the binder part 11. However, since the portion of the lightening hole 63b is reinforced by the wall part of the reinforcing panel 40, the underrun protection 10 has higher bending stiffness at the portion of the lightening hole 63b than the bending stiffness at the portion of the lightening hole 63a in each edge part 12.

As illustrated in FIG. 9, among the four lightening holes 64 formed in the middle part 13, two lightening holes 64 are laterally arranged at each of the left and the right portions on the outer sides of the middle lightening holes 62. Focusing on two lightening holes 64 formed either side of the left and the right portions, one lightening hole 64a has a smaller hole diameter of the vertical direction than the hole diameter of the vertical direction of the other lightening hole 64b arranged closer to the adjacent binder part 11 (i.e., on the outer side along the width direction of the vehicle). For the above, considering the proximal panel 30 alone, a portion of the lightening hole 64b closer to the binder part 11 has smaller bending stiffness than that of the lightening hole 64a further from the binder part 11. However, since the portion of the lightening hole 64b is reinforced by the wall part of the reinforcing panel 40, the underrun protection 10 has higher bending stiffness at the portion of the lightening hole 64b than the bending stiffness at the portion of the lightening hole 64a in the middle part 13.

After the above holes 61-65 are formed on the flat plate member, the plate is bent at the lines along the lateral direction to segment the web 31 and the flanges 32 and 33, so that the proximal panel 30 is manufactured. The proximal panel 30 is thereby manufactured such that the web 31 and the flanges 32 and 33 straightly extend along the lateral direction, and the proximal panel 30 has a uniform cross section along the lateral direction.

1-2-3. Reinforcing Panel

Figure 10:
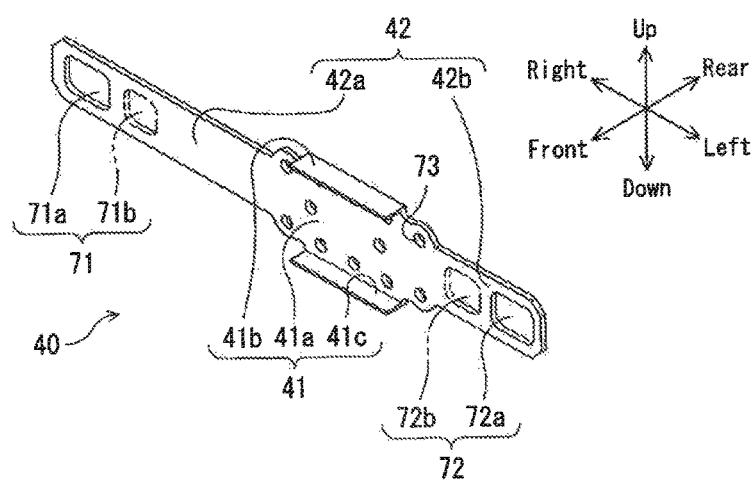
FIG. 10 is a perspective view solely showing a reinforcing panel of an underrun protection of the first embodiment.

As illustrated in FIGS. 7 and 10, each reinforcing panel 40 includes a body (main body of the reinforce panel) 41 having a section (the cross section perpendicular to the lateral direction of the reinforcing panel) in the form of a channel and extending parts (extending parts of the reinforcing panel 40) 42 having cross sections forming straight lines and extending from the body 41 along the width direction of the vehicle.

The body 41 is arranged on each binder part 11 and has a section (i.e., the cross section perpendicular to the lateral direction of reinforcing panel 40) in the form of a C-shape, i.e., the channel shape. Accordingly, as shown in FIG. 10, the body 41 includes a web 41a vertically arranged and flanges 41b and 41c formed by bending the upper edge and the lower edge of the web 41a in the same direction so as to protrude forward of the vehicle. Namely, the body 41 has the web 41a arranged on the proximal side and the flanges 41b and 41c having tips directing the distal side.

The web 41a extends along the width direction of the vehicle and is vertically arranged. On the web 41a, installation holes 73 (the reference number is attached to one of the installation holes in FIG. 10) as detailed below are formed.

The flanges 41b and 41c extend along the width direction of the vehicle and stick out along the longitudinal direction of the vehicle. The flanges 41b and 41c are configured in the same way except for the difference whether each flange is connected at the upper edge or the lower edge of the web 41a.

As shown in FIGS. 7 and 10, the extending parts 42 include a middle extending part 42a that is arranged in a portion closer to the binder part 11 (see FIG. 7) within the middle part 13 and an edge extending part 42b arranged in a portion closer to the binder part 11 within the edge part 12 (see FIG. 7).

The lightening holes 71 and 72 are formed at the both edges of the middle extending part 42a and the edge extending part 42b in the width direction of the vehicle, respectively. Here, one lightening hole 71 and one lightening hole 72 are formed on the middle extending part 42a and the edge extending part 42b, respectively.

In cases where the proximal panel 30 omits thereon the lightening holes 63b and 64b but does form thereon lightening holes 63a and 64a or where the proximal panel 30 omits thereon the lightening holes 63a, 63b, 64a, and 64b, two lightening holes 71 and two lightening holes 72 may be formed on each reinforcing panel 40 as illustrated by two-dot broken lines in FIGS. 7 and 10. In this case, the lightening holes 71a and 72a closer to the both edges of the reinforcing panel 40 are formed to be larger than the respective lightening holes 71b and 72b closer to the center position of the reinforcing panel 40. Thereby, each reinforcing panel 40 has higher bending stiffness at portions of the lightening holes 71b and 72b than the bending stiffness at portions of the lightening holes 71a and 72a.

As illustrated in FIG. 10, the middle extending part 42a extends from the web 41a of the body 41 to the inner side along the width direction of the vehicle. For the above, the middle extending part 42a is formed so as to extend from the binder part 11 into the middle part 13 of the underrun protection 10, as illustrated in FIG. 7. However, the middle extending part 42a does not extend to reach the center C of the width direction of the vehicle in the middle part 13 of the underrun protection 10.

If two lightening holes 71a and 71b are formed on the edge of the middle extending part 42a (here, the inner edge along the width direction of the vehicle), one of the lightening hole 71a is formed larger than the other lightening hole 71b formed closer to the body 41 of the reinforcing panel 40. This means that the lightening holes 71a and 71b arranged at the middle extending part 42a are formed to become larger as approaching the edge of the middle extending part 42a.

The edge extending part 42b extends to the outer side of the web 41a of the body 41 along the width direction of the vehicle. For the above, the edge extending part 42b is formed so as to extend from the binder part 11 into the edge part 12 of the underrun protection 10, as illustrated in FIG. 7. However, the edge extending part 42b does not extend to reach the outer end of the edge part 12 of the underrun protection 10 along the width direction of the vehicle.

As illustrated in FIG. 10, if two lightening holes 72a and 72b are formed on the edge of the edge extending part 42b (here the outer edge along the width direction of the vehicle), one lightening hole 72a is formed larger than the other lightening hole 72b formed closer to the body 41 of the reinforcing panel 40. This means that the lightening holes 72a and 72b are formed to be larger as approaching the end of the edge extending part 42b.

1-3. Arrangement of the Distal Panel, the Proximal Panel, and the Reinforcing Panels Next, the relative arrangement of the distal panel 20, the proximal panel 30, and the reinforcing panels 40 will now be described.

The common structure along the entire extending direction of the underrun protection 10 will now be described with reference to FIGS. 6A and 6B.

In the main body 10A of underrun protection 10, the distal panel 20 and the proximal panel 30 are bound to each other so as to have parts (hereinafter called engaged overlapping parts) 91 (the reference number is attached to its upper portion in FIG. 6) at which tips 22a and 23a of the flanges 22 and 23 of the distal panel 20 are brought into contact with and bounded to tips 32a and 33a of the flanges 32 and 33 of the proximal panel 30, respectively, so that the main body 10A forms a hollow having a closed section. Here, description will now be made, assuming that the closed section that the underrun protection 10 and the main body 10A form is a rectangular box shape. The flanges 22 and 23 of the distal panel 20 are arranged outside the flanges 32 and 33 of the proximal panel 30, so that the distal panel 20 is fitted to the exterior of the proximal panel 30.

The main body 10A of underrun protection 10 includes a front face 10a formed of the web 21 of the distal panel 20, a rear face 10b formed of the web 31 of the proximal panel 30, an upper face 10c formed of the flange 22 of the distal panel 20 and the flange 32 of the proximal panel 30, and a lower face 10d formed of the flange 23 of the distal panel 20 and the flange 33 of the proximal panel 30. The faces 10a, 10b, 10c, and 10d take shapes of flat plates.

Figure 6A:
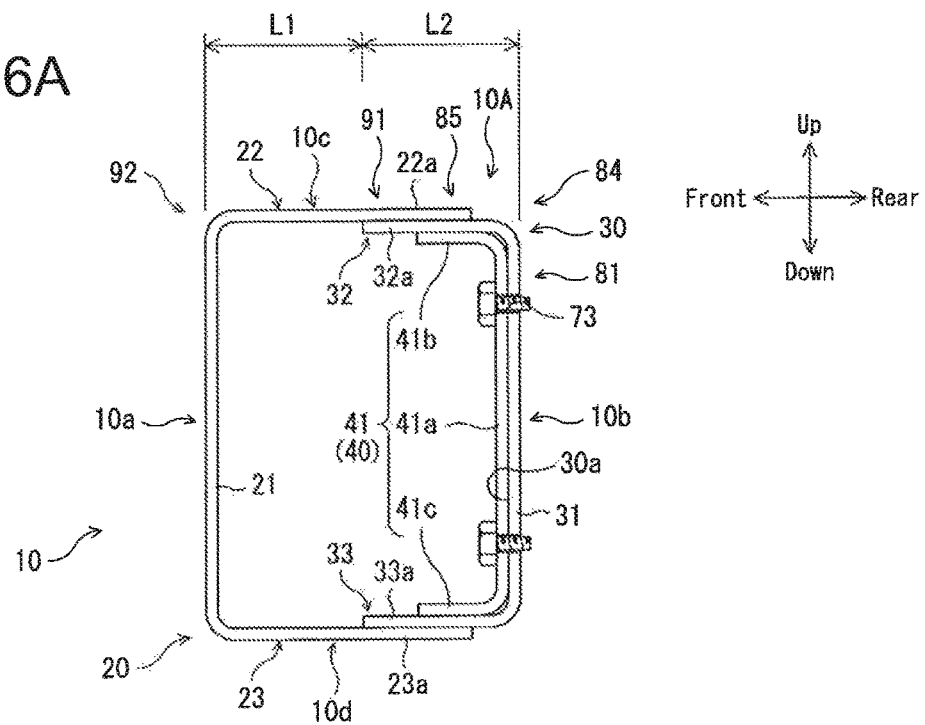
FIG. 6 is sectional views of an underrun protection of the first embodiment, FIG. 6A being a cross sectional view of a binder part and FIG. 6B being a cross sectional view of a middle part or an edge part.
Figure 6B:
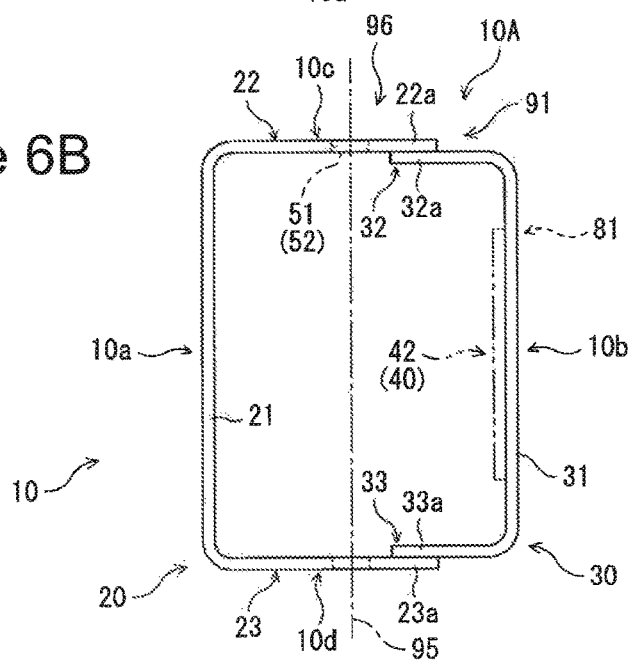

In the illustrated example, the flanges 22 and 23 of the distal panel 20 have shorter lengths along the longitudinal direction of the vehicle within the edge parts 12 and the middle part 13 (see FIGS. 1,2, and 7) of the underrun protection 10 as shown in FIG. 6B compared to the length of the flanges 22 and 23 of the distal panel 20 along the longitudinal direction of the vehicle within the binder parts 11 (see FIGS. 1, 2, and 7) of the underrun protection 10 as shown in FIG. 6A. The flanges 32 and 33 of the proximal panel 30 are set to have shorter lengths along the longitudinal direction of the vehicle within the binder parts 11 than the lengths of the flanges 32 and 33 of the proximal panel 30 along the longitudinal direction of the vehicle within the edge parts 12 and the middle part 13.

Next, description will now be made in relation to the structures of the binder parts 11 (see FIGS. 1, 2, and 7) of the underrun protection 10 with reference to FIG. 6A and in relation to the structures of the edge parts 12 and the middle part 13 (for both, see FIGS. 1, 2, and 7) with reference to FIG. 6B.

Within each binder part 11 of the underrun protection 10, as illustrated in FIG. 6A, the reinforcing panel 40 is disposed so as to be in entirely contact with the inner face of the rear face 10b of the hollow space of the main body 10A, that is, so as to be entirely in contact with the inner face 30a of the proximal panel 30. In other words, the entirety of the reinforcing panel 40 is brought into contact with the inner face 30a of the proximal panel 30. Here, the wording "in entirely contact" and the relevant expressions include a state where the members (here, the proximal panel 30 and the reinforcing panel 40) do not keep in contact with each other because of manufacturing error of the members and a state where, since at a portion that requires considerable accuracy to bring the members into an contact with each other, the shape of an inner member (here the reinforcing panel 40) is sometimes set such that the inner member is slightly apart from the outer member (here the proximal panel 30) to ensure the contact between the flat faces of the members, and the members are not in contact with each other at such a portion.

Here, the body 41 of the reinforcing panel 40 is bound to the proximal panel 30 such that the inner faces of a web 41a and flanges 41b and 41c are respectively in contact with the inner faces of the web 31 and the flanges 32 and 33. Specifically, the web 41a of the body 41 of the reinforcing panel 40 is in contact with the web 31 of the proximal panel 30 and the flanges 41b and 41c of the body 41 of the reinforcing panel 40 are in contact with the flanges 32 and 33 of the proximal panel 30 respectively.

Each reinforcing panel 40 is arranged so as to overlap the entirety of the corresponding binder part 11 of the underrun protection 10 along the lateral direction. A part at which the reinforcing panel 40 is arranged is referred to as a reinforcing overlapping part 81 at which the reinforcing panel 40 overlaps the main body 10A. The multiplexed panel part 80 (see FIG. 1) is arranged at the entirety of the binder part 11 along the lateral direction and includes the reinforcing overlapping part 81 in the cross section thereof.

In this example, the installation holes 73 (the reference number is attached to one of the holes in FIG. 6B, first installation hole, second installation hole) are formed in the reinforcing overlapping part 81. Each installation hole 73 in the reinforcing overlapping part 81 is used to fasten and fix the proximal panel 30 and the reinforcing panel 40 together to the bracket 5 (see FIGS. 1 and 2) by means of a common fastening member such as a common set of a bolt and a nut.

Here, the reinforcing panel 40 is bound to the inner face 30a of the proximal panel 30 and also to the engaged overlapping part 91 so as to form a multiplexed part 85 at which three panels overlap and are in contact with each other. The multiplexed parts 85 include the flanges 41b and 41c of the body 41 of the reinforcing panel 40; flanges 32 and 33 of the proximal panel 30; and the flanges 22 and 23 of the distal panel 20 that are respectively brought into contact in this order from the inside of the hollow. The lengths of the flanges 41b and 41c of the reinforcing panel 40; the flanges 32 and 33 of the proximal panel 30; and the flanges 22 and 23 of the distal panel 20 come to be larger along the longitudinal direction of the vehicle in this order.

The upper face (corresponding to the upper face 10c of the main body 10A) of the underrun protection 10 includes a single panel part 92 formed only of the distal panel 20 at the distal side of the vehicle and an overlapping panel part 84 formed of multiple overlapping panels 20, 30 and 40 being in contact with one another at the proximal side of the vehicle.

Likewise, the lower face (corresponding to the lower face 10d of the main body 10A) of the underrun protection 10 includes a single panel part 92 formed only of the distal panel 20 at the distal side of the vehicle and an overlapping panel part 84 formed of multiple overlapping panels 20, 30 and 40 being in contact with one another at the proximal side of the vehicle.

The length L1 of the single panel part 92 along the longitudinal direction of the vehicle is set to be almost the same as the length L2 of the overlapping panel part 84 along the longitudinal direction of the vehicle (L1≈L2).

At the overlapping panel part 84, the reinforcing overlapping part 81 at which flange 32 of the proximal panel 30 is in contact with the flange 41b of the reinforcing panel 40 and the engaged overlapping part 91 at which the edge 22a of the flange 22 of the distal panel 20 is in contact with the edge 32a of the flange 32 of the proximal panel 30 are arranged so as to overlap in the longitudinal direction of the vehicle. The multiplexed part 85 is formed at a position where the reinforcing overlapping part 81 overlaps the engaged overlapping part 91 along the longitudinal direction of the vehicle within the overlapping panel part 84.

In other words, the multiplexed parts 85 are formed by extending the flanges 22 and 23 of the distal panel 20 to the reinforcing overlapping parts 81 at which the flanges 41b and 41c of the body 41 of the reinforcing panel 40 respectively overlap the flanges 32 and 33 of the proximal panel 30 so as to overlap the reinforcing overlapping parts 81.

As shown in FIG. 6B, the reinforcing panel 40 is not arranged on portions (hereinafter called "non-installed portions") of the edge parts 12 and the middle part 13 of the underrun protection 10 except for the remaining portions adjacent to the binder parts 11. Namely, at the non-installed portions of the edge parts 12 and the middle part 13 of the underrun protection 10, simplex body parts 90 formed only of the main body 10A of underrun protection 10 but not including the reinforcing overlapping part 81 are disposed.

As shown by the two-dot broken line in FIG. 6B, since the extending parts 42 of the reinforcing panel 40 is arranged so as to extend from the binder part 11 to part of the edge part 12 and the middle part 13, the extending parts 42 are arranged at portions adjacent to the binder part 11 in the edge part 12 and the middle part 13. Specifically, the extending part 42 is arranged so as to be in contact with the inner face at the inside of the web 31 of the proximal panel 30. For the above, at portions adjacent to the binder part 11 in the edge part 12 and the middle part 13, the reinforcing overlapping parts 81 at which the reinforcing panel 40 is in contact with the proximal panel 30 are formed and the multiplexed panel parts 80 are also arranged at the same portions.

As shown by the two-dot broken line in FIG. 6B, within the middle part 13 of the underrun protection 10, the above-described middle lightening holes 51 (52) are formed on the flanges 22 and 23 of the distal panel 20 which flanges 22 and 23 respectively form the upper face and the lower face of the underrun protection 10.

These middle lightening holes 51 (52) are formed on a lightening hole forming parts 96, which are at the middle part of the underrun protection 10 along the longitudinal direction of the vehicle and include an equidistance portion 95 which is equally distant from the front face 10a and from the rear face 10b.

The edges 22a and 23a of the flanges 22 and 23 of the distal panel 20 extend to positions that include the lightening hole forming parts 96 where the middle lightening holes 51 (52) are formed. The inner faces of the edges 22a and 23a are brought into contact with the outer faces of the edges 32a, 33a of the flanges 32 and 33 of the proximal panel 30, respectively, and keeping this positional relationship, the edges 22a and 23a of the distal panel 20 are bound to the edges 32a and 33a of the proximal panel 30 by welding, respectively. The parts where the edges 22a and 32a are bounded and the edges 23a and 33a are bounded form the above-described engaged overlapping parts 91. In the illustrated example, lightening holes 51 (52) are formed on the single panel parts 92.

Also the edge lightening holes 53 (see FIG. 4) are formed on the lightening hole forming parts 96 including the equidistance portion 95 in the underrun protection 10.

2. Results and Effects

The underrun protection 10 of the present invention, which has the above-described structure, brings the following results and effects.

The reinforcing panels 40, 40 are arranged so as to be in contact with the inner face on the side of the rear face 10b of the hollow formed by the main body 10A, so that the main part of the main body 10A (portion on the side of the rear face 10b inside the hollow of the main body 10A) is reinforced to ensure the strength and the stiffness of the underrun protection 10. This structure can reduce the weight and the resultant material cost, concurrently ensuring the strength and the stiffness.

Specifically, since the distal panel 20, the proximal panel 30, and the reinforcing panels 40, 40, which collectively form the main body 10A, are made of ultrahigh tensile strength steel plates, the main body 10A that ensures the strength and the stiffness but is light in weight can be manufactured using thinner steel plates. Consequently, the cost for the main body 10A can be saved as compared with using aluminum material which is more expensive than steel.

In the underrun protection 10, there is a possibility that the binder part 11 is affected by a large bending moment when a load is input into the edge part 12 which has a cantilever structure. The edge parts 12 and the middle part 13 require strength and stiffness smaller than those that the binder parts 11 require.

Since the simplex body parts 90, which is formed only of the main body 10A of underrun protection 10 and which the reinforcing panel 40 does not overlap, are formed at the edge parts 12 and the middle part 13, which require relatively small strength and stiffness, the main body 10A of underrun protection 10 can have simple structure that can contribute to weight reduction. In contrast, the multiplexed panel parts 80 having the reinforcing overlapping part 81 formed by bringing the reinforcing panel 40 into contact with the entirety of the inner face of the rear face 10b inside the hollow of the main body 10A are formed at each binder part 11, which requires relatively high strength and stiffness.

Such a simple structure of the reinforcing panel 40 can increase the second moment of area, which can ensure requisite strength and stiffness.

Since arrangement of the multiplexed panel parts 80 and the simplex body parts 90 onto the parts (i.e., the binder parts 11, the edge parts 12, and the middle part 13) depends on the required strength and stiffness that the respective parts require, the total weight of the underrun protection 10 can be saved, ensuring requisite strength and stiffness.

Since the closed section of the main body 10A of underrun protection 10 has a rectangular closed section, which is a quite common shape of steel material, the production cost for the main body 10A of underrun protection 10 can be saved.

The main body 10A, which is formed by binding the distal panel 20 arranged at the distal side of the vehicle and the proximal panel 30 disposed at the proximal side of the vehicle to each other, can be manufactured with ease, saving the production cost. For example, the above underrun protection 10 equipped with the reinforcing panels 40 is manufactured by firstly binding the reinforcing panels 40 to the inner face of the proximal panel 30 and then binding the distal panel 20 to the proximal panel 30. Thereby, the reinforcing panels 40, 40 are easily arranged inside the hollow of the underrun protection 10. The rectangular closed section of the main body 10A can be formed of the distal panel 20 and the proximal panel 30 which are typical panels having channel shape section, so that the production cost of the main body 10A of the underrun protection 10 can be saved.

Each reinforcing panel 40 consists of the body 41 being arranged only on the binder part 11 and being in contact with the inner face 30a of the proximal panel 30; and the extending parts 42 extending from the web 41a of the body 41 along the width direction of the vehicle and being in contact with the inner face 30a of the web 31 of the proximal panel 30. With this reinforcing panels 40, 40, predetermined portions (i.e., the binder parts 11) and portions being adjacent to the binder parts 11 in the edge parts 12 and the middle part 13) mainly including the binder parts 11 along the width direction of the vehicle are reinforced to surely exert the strength and the stiffness of the underrun protection 10 to compete against the bending moment.

The lightening holes 71 and 72 formed in the edges of the extending parts 42 along the width direction of the vehicle can enhance the weight reduction. For example, if the lightening holes 71a and 71b formed in the middle extending part 42a are formed to be larger as approaching the ends of the reinforcing panel 40 and/or the lightening holes 72a and 72b formed on the edge extending part 42b are formed to be larger as approaching the ends of the reinforcing panel 40, the stiffness being able to compete against the bending moment can be appropriately ensured, achieving weight reduction.

Since the distal panel 20 includes edge bents 29 formed at the both edges of the lateral direction of the panel 20 and bent toward the proximal panel 30, the distal panel 20 can have the both edges of the lateral direction backward bent at the edge bents 29 so as to conform to the backward-bent left and right edges of the front bumper to be attached at the immediately front of the underrun protection 10. This allows the proximal panel 30 to have a uniform cross sectional shape along the lateral direction of the panel 30, so that processing cost of the proximal panel 30 can be saved.

In order to prevent the lightening holes from deforming when the panels are subjected to the bending process, the lightening holes are preferably formed at points which are not bent. The structure described above includes the proximal panel 30 that has a uniform cross sectional shape along the lateral direction of the panel 30, so that the lighting holes 61-64 can be easily formed on the proximal panel 30.

Generally, if a member into which a load is input has larger supporting stiffness, buckling caused by the input load can be suppressed. Since each engaged overlapping part 91 includes the multiplexed part 85 at which three panels 20, 30, and 40 overlap, the stiffness at the multiplexed part 85 and the peripheral thereof can be improved to inhibit generation of buckling.

Even when the binder part 11 is affected by a large bending moment caused by, for example, inputting the load P1 into the underrun protection 10, the improved stiffness at the multiplexed part 85 and the peripheral thereof can inhibit generation of buckling.

If the single panel part 92 has a longer length along the longitudinal direction of the vehicle, a thinner plate thickness, and/or a lower stiffness at the edges along the longitudinal direction of the vehicle, buckling is more easily generated when a load in the longitudinal direction, such as the load P1, is input. Considering the above points, the presence of the overlapping panel part 84 formed by overlapping multiple panels 20, 30, and 40 at the proximal side of the underrun protection 10 can suppress the length of the single panel part 92 along the longitudinal direction, can also improve the stiffness at the proximal side of the underrun protection 10, and further can inhibit generation of buckling.

The length L1 of the single panel part 92 along the longitudinal direction of the vehicle is set to be almost the same as the length L2 of the overlapping panel part 84 along the longitudinal direction of the vehicle (L1≈L2). This setting to set the length L1 of the single panel part 92 in the longitudinal direction to be short contributes to inhabitation of buckling.

Since the installation holes 73 are formed on the reinforcing overlapping part 81 and each installation hole 73 on the reinforcing overlapping part 81 is used to fasten and fix the proximal panel 30 and the reinforcing panel 40 to the bracket 5 (see FIGS. 1 and 2) by means of a common fastening member such as a common set of a bolt and a nut, the fastening member can be reduced as compared with cases where the reinforcing panel 40 is bound to the proximal panel 30 separately from the binding of the proximal panel 30 and the bracket 5. Consequently, such a common fastening member contributes to cost saving.

When the proximal panel 30 and the reinforcing panel 40 are fastened and fixed to the bracket 5 (see FIGS. 1 and 2) using a common fastening member such as a set of a bolt and a nut, the reinforcing panel 40 functions as a washer for the bolt or the nut to improve the stability of fastening, reducing required elements.

The elements for fastening can be reduced as the above, which also leads to weight reduction.

Since the lengths of the flanges 41b and 41c of the reinforcing panel 40; the flanges 32 and 33 of the proximal panel 30; and the flanges 22 and 23 of the distal panel 20 come to be longer along the longitudinal direction of the vehicle in this order, the length of the flanges 41b and 41c of the reinforcing panel 40 does not come to be longer, which contributes to weight reduction.

Since the panels 20, 30, and 40 are made of the same tensile strength steel plate (the same material) having the same thickness, it is possible to eliminate the requirement to prepare multiple materials, reducing the material cost.

On the underrun protection 10, lightening holes formed on the upper face and the lower face less reduce the stiffness than lightening holes formed on the front face and the rear face. Considering the above, since the multiple lightening holes 51, 52, and 53 are formed on the upper face and the lower face, the total weight of the underrun protection 10 can be effectively suppressed, avoiding lowering the stiffness (i.e., avoiding reduction in second moment of area).

Since the underrun protection 10 has lightening holes 51, 52, and 53 being formed on the flanges 22 and 23 of the distal panel 20 and having different hole diameters of the lateral direction, the freedom in arrangement of the lightening holes 51, 52 and 53 along the extending direction of the underrun protection 10 can be improved as compared with cases where multiple lightening holes (hereinafter referred to as "equi-diameter lightening holes") having the same hole diameter along the lateral direction are formed. For example, only the intervals of such equl-diameter lightening holes can be changed while the lightening holes 51, 52 and 53 of the present invention can change the diameters thereof along the lateral direction as well as the intervals. This means that the lightening holes 51, 52 and 53 can have an enhanced degree of freedom in arrangement on the underrun protection 10. Namely, determination of the region where lightening holes 51, 52 and 53 are arranged and the intervals of the lightening holes 51, 52 and 53 on the upper and lower faces of the underrun protection 10 has a high degree of freedom. This makes it possible to arrange lightening holes 51, 52 and 53, considering various factors such as torsion acting on the underrun protection 10 and the bending moment generated by a vertical load. Consequently, the weight of the underrun protection 10 can be further reduced.

The lightening holes 51, 52, and 53 are formed at the same points both of the flanges 22 and 23 of the distal panel 20, which can reduce the processing cost and can easily eject foreign objects come into the underrun protection 10.

The lightening holes 51, 52 and 53 formed on the lower face of the underrun protection 10 allow foreign objects such as water and dirt to come inside the underrun protection 10 to come out so that such objects are not built up inside the underrun protection 10. This avoids corrosion of the underrun protection 10 to enhance the durability of the underrun protection 10.

Furthermore, the lightening holes 51, 52, and 53 formed on the lower face of the underrun protection 10 allow the paint applied to underrun protection 10 to easily drain out, which contributes to improvement in the coating quality. In particular, when the underrun protection 10 is coated by immersing into the paint, the paint can be surely drained out of the hollow through the lightening holes, so that the coating quality can be improved.

In the underrun protection 10, the higher stiffness of the corners of the rectangular section ensures the higher second moment of area while the stiffness of the middle portions of the respective faces defining the rectangular section less affects the second moment of area. Considering the above, since the lightening holes 51, 52, and 53 are formed on the middle portion on the underrun protection 10 in the longitudinal direction of the vehicle that less affects the second moment of area, specifically in the lightening hole forming part 96 including the equidistance portion 95, which has an equidistance from both the front face 10a and the rear face 10b of the main body 10A of underrun protection 10, the weight of the underrun protection 10 can be reduced, efficiently preventing the decline of the second moment of area. Further, the lightening holes 51, 52, and 53, which are set to have the same hole diameter in the longitudinal direction of the vehicle, reduce the processing cost thereof and prevent decline of the second moment of area.

Since the edges 22a and 23a of the flanges 22 and 23 of the distal panel 20 extend to include the respective lightening hole forming parts 96 where the lightening holes 51, 52, and 53 are formed, the lightening holes 51, 52, and 53 are formed on the flanges 22 and 23 of the distal panel 20. This structure makes it easy to form the lightening holes 51, 52, and 53 both on the flanges 22 and 23 concurrently with press-cutting of the outer shape of the distal panel 20.

The inner faces of the edges 22a and 23a of the flanges 22 and 23 of the distal panel 20 are respectively brought into contact with the outer faces of the edges 32a and 33a of the flanges 32 and 33 of the proximal panel 30, and are bound to the outer face of the edges 32a and 33a, respectively, by welding. This binding manner prevents the flanges 32 and 33 of the proximal panel 30 projecting frontward of the vehicle, from exposing, which can further improve the safety.

The lightening holes 61 and 62, which are arranged on the proximal panel 30 along the extending direction of the underrun protection 10, are set to have larger hole diameter in the vertical direction as departing from the binder parts 11, 11. This structure ensures large strength and stiffness by setting the lightening holes 61 and 62 adjacent to the binder parts 11, 11 to have small hole diameters while efficiently lightens the weight of the underrun protection 10 by setting the lightening holes 61 and 62 apart from the binder parts 11, 11 to have large hole diameters. Consequently, the weight reduction of the underrun protection 10 can be efficiently achieved, also ensuring the demanded strength and stiffness.

Namely, multiple lightening holes 61 and 62 are formed so as to have larger diameters in the vertical direction as departing from the binder parts 11, 11 to compete against the distribution of the bending moment of the underrun protection 10 caused by the load P1, so that the respective parts arranged extending direction of the underrun protection 10 have bending stiffness that can compete against the distribution of the bending moment. Accordingly, the weight reduction of the underrun protection 10 can be more efficiently achieved by forming the lightening holes 61 and 62, ensuring the demanded bending stiffness to compete against the distribution of the bending moment caused by load P1.

Since the lightening holes 61 and 62 include the rectangular holes 61b, 61c, and 62b having rectangular openings when seen from the front, such large openings can promote efficient weight reduction.

Since the multiple lightening holes 61 formed on each edge part 12 are set to have larger hole diameters in the vertical direction as distant farther from the binder part 11, underrun protection 10 can efficiently achieve the weight reduction and ensure demanded strength and stiffness in the edge part 12.

Others

The first embodiment is described as the above, but the present invention should by no means be limited to the foregoing embodiment. Various changes and modifications can be suggested without departing from the gist of the present invention. The respective structures of the first embodiment may be adapted, omitted, or combined according to the requirement.

The first embodiment assumes that the panels 20, 30, and 40 are made of ultrahigh tensile strength steel plates having a tensile strength of 980 MPa. Alternatively, the panels 20, 30, and 40 may be made of various ultrahigh tensile strength steel plates having a tensile strength of 980 MPa or more (e.g., 1.2 GPa or 1.5 GPa) or some of the panels may be made of plate material that is different from ultrahigh tensile strength steel plates.

The above description assumes that the panels 20, 30, and 40 have a thickness t of 3.2 mm. However, steel plates having any thickness can be used as far as the plates satisfy requisite strength and stiffness. The panels 20, 30, and 40 may of course have respectively different tensile strengths and thicknesses from one another.

The above first embodiment described that the lightening holes 51, 52, and 53 on the upper face 10c of the main body 10A of underrun protection 10 are at the same positions of the lightening holes 51, 52, and 53 formed on the lower face 10d. However, the lightening holes 51, 52, and 53 on the upper face 10c may not be formed at the same positions as those on the lower face 10d. Alternatively, the lightening holes 51, 52, and 53 may be formed either one of the upper face 10c or the lower face 10d. Further, as far as the lightening holes 51, 52 and 53 are formed on the upper face 10c and the lower face 10d of the main body 10A of underrun protection 10, the lightening holes 51, 52, and 53 may be formed outside the equidistance portions 95 and may not have the same hole diameter of the longitudinal direction of the vehicle.

The first embodiment forms the lightening holes 51, 52 and 53 on the upper face 10c and the lower face 10d, the lighting holes 61, 62, 63 and 64 on the rear face 10b, and the lightening holes 71 and 72 on the reinforcing panels 40, 40. These lightening holes may partially formed and the remaining may be omitted.

The lightening holes 51, 52 and 53 may be formed on the flanges 32 and 33 of the proximal panel 30, not on the flanges 22 and 23 of the distal panel 20. In this alternative case, the flanges 32 and 33 of the proximal panel 30 are formed to extend to the lightening hole forming parts 96 (see FIG. 6B) that include the middle portion of the longitudinal direction of the underrun protection 10 and also include the equidistance portions 95 that are equally distant from the front face and the rear face of the underrun protection 10.

The first embodiment assumes that the lightening holes 71 and 72 are formed on each reinforcing panel 40. Alternatively, some or all of the holes 71 and 72 may not be formed. Specifically, the lightening holes 71b and 72b on a side of the center of the reinforcing panel 40 may not be formed or all the holes 71a, 71b, 72a, and 72b may not be formed.

The flanges 41b and 41c of the body 41 of each reinforcing panel 40 may have lengths of the longitudinal direction longer than the lengths of the longitudinal direction that the flanges 32 and 33 of the proximal panel 30 have. In this alternative example, the reinforcing panel 40 is bound to the inner face 30a of the proximal panel 30, then bound to the inner faces of the flanges 22 and 23 of the distal panel 20, keeping in contact with each other. This structure arranges the overlapping panel parts 84 also at the distal side of the engaged overlapping parts 91 in addition to the proximal side of the engaged overlapping parts 91.

Further, each reinforcing panel 40 assumes to have a extending part 42 that extends from the body 41 along the width direction of the vehicle. Alternatively, either one or both extending parts 42 may not be formed. For example, the reinforcing panel 40 may be formed of the body 41 and either one of the middle extending part 42a or the edge extending part 42b and otherwise formed only of the body 41. Focusing only on the technique related to the lightening holes, the reinforcing panels 40, 40 themselves may be omitted.

The first embodiment assumes the underrun protection 10 and main body 10A have a rectangular closed section by binding distal panel 20 to the proximal panel 30 both having channel-shaped cross sections. However, as far as the underrun protection 10 and the main body 10A have a rectangular closed section, the cross sections of the panels 20 and 30 should by no means be limited to a channel shape and various shapes of the cross sections can be suggested. For example, the cross sections of the panels 20 and 30 may be formed to be L shapes, or one of the cross sections of the panels 20 and 30 may be formed to be a channel shape and the other may be formed to be a straight line. Likewise, the cross sections of the reinforcing panels 40, 40 may take various shapes.

The above first embodiment assumes each multiplexed part 85 is formed of three overlapping panels 20, 30, and 40. Alternatively, the multiplexed part 85 may be formed of four or more overlapping panels by further overlapping another panel with the inner face of the reinforcing panel 40 or the outer face of the proximal panel 30. This structure improves the strength and the stiffness but increases the weight. Therefore, the multiplexed part 85 is preferably formed, considering compatibility between the strength and the stiffness to be ensured and the weight increase.

The first embodiment assumes the underrun protection 10 and the main body 10A form a closed rectangular section. However, the shape of the section is not limited to a rectangle and may alternatively be a circle or a polygon except for a rectangular. In this alternative, the sectional shape of the panels 20, 30, and 40 conform to a closed cross section that the underrun protection 10 and the main body 10A form.

Various known methods of binding can be applied to the bindings of the panels 20, 30 and 40 of the underrun protection 10 with one another and the bindings of the underrun protection 10 with the brackets 5, 5. Examples of the method of binding include welding bind such as plug welding or fillet welding, or fastening with rivets, and blots and nuts. For the above, the installation holes 73 to bind the underrun protection 10 with the brackets 5, 5 using a fastening member are not always necessary.

Furthermore, the main body 10A of underrun protection 10 is not limited to being formed by binding the two panels of the distal panel 20 and the proximal panel 30 with each other and may alternatively be formed of a single panel or three or more panels being bound. If the main body 10A is formed of a single panel, various manners can be applied which are exemplified by binding the edges of the cross sections of the panels and extruding the panel.

The first embodiment assumes the entirety of the reinforcing panel 40 is brought into contact with the inner face on the side of the rear face 10b in the hollow of the main body 10A. Alternatively, the reinforcing panel 40 may be partially in contact with and partially overlap the main body 10A.

Into the underrun protection 10, loads may be input from various directions. Therefore, the underrun protection 10 has multiple prospective points that should ensure the strength and the stiffness, that is, points should be reinforced. In the underrun protection 10, a reinforcing panel, which is brought into contact with the inner face of the proximal panel 30 to reinforce the rear face 10b of the underrun protection 10 in the first embodiment, may also be in contact with and reinforce at least one of the front face 10a, the upper face 10c, and the lower face 10d in the main body 10A of underrun protection 10. In this alternative, a point to be reinforced by the reinforcing panel is preferably determined by considering assumable collision of the vehicle and installation state of the underrun protection 10.

For example, a reinforcing panel 40 may be bound to the inner face of the distal panel 40 (sic: 20), keeping in contact with each other. In this case, a single panel part formed only of the proximal panel 30 is formed on the proximal side of the vehicle and a simplex body part formed only of the main body 10A of underrun protection 10 but not including the reinforcing overlapping part 81 is formed on the proximal side. Meanwhile, an overlapping panel part where multiple panels such as the distal panel 20 and the reinforcing panel 40 overlap is formed on the distal side of the vehicle and the reinforcing overlapping part where the main body 10A overlaps the reinforcing panel 40 is formed on the distal side of the vehicle.

The length L1 of the single panel part 92 in the longitudinal direction of the vehicle may be set shorter than the length L2 of the overlapping panel part 84 in the longitudinal direction (i.e., L1<L2).

The first embodiment assumes that the underrun protection 10 is connected to a pair of brackets 5, 5 disposed on the left and the right. Alternatively, multiple pairs of right and left brackets may be provided and connected thereto the underrun protection 10.

The above first embodiment assumes to have the lightening holes 61 and 62 formed on the rear face 10b of the main body 10A. The lightening holes 61 and 62 are satisfactorily formed on at least one of the rear face 10b and the front face 10a. Further, the edge lightening holes 61 may be omitted.

The hole diameters of the lightening holes 61 and 62 along the vertical direction satisfactorily come to be larger as departing farther from the adjacent binder part 11, and the lines connecting the top and the bottom ends of the respective holes may not be straight lines. For example, if the underrun protection has a curved distribution of the bending moment caused by a load applied to the both edges of the extending direction of the underrun protection from the outside along the longitudinal direction of the vehicle, the hole diameters of the respective lightening holes may be set such that the lines connecting the top and the bottom ends of the respective holes form curves.

The vertical diameters of the lightening holes 61 and 62 may be set to compete against the distribution of the bending moment acting on the underrun protection 10 and being caused not only by the load P1 but also by all the loads P1, P2, and P3, and otherwise may be set based on a factor different from the distribution of bending moment.

The shapes and the number of lightening holes 61 and 62 detailed above are examples and can be appropriately changed. As described above, the lightening holes 61 and 62 formed into rectangles enhance the weight reduction while the lightening holes 61 and 62 formed into circles avoid sharp change of second moment of area. Forming the lightening holes 61 and 62 into the same shape can save the processing cost. An increase in the number of lighting holes 61 and 62 by forming more lightening holes 61 and 62 shorter in length of the lateral direction makes it possible to more precisely adjust the bending stiffness along the extending direction of the underrun protection 10.

The edge lightening holes 61b and 61c and the second middle lightening hole 62b have the rectangular shapes when seen from the front, but alternatively may be formed to have squares seen from the front or may be rectangles longer in lateral direction or longer in vertical direction.

REFERENCE SIGNS LIST 1 frame
  2 side frame
  3 cross member
5 bracket
10 underrun protection
  10A main body of underrun protection
    10a front face (distal face in the longitudinal direction of vehicle)
    10b rear face (proximal face in the longitudinal direction of vehicle)
    10c upper face
    10d lower face
  11 binder part
  12 edge part
  13 middle part
20 distal panel
  21 web
  22 flange
    22a edge (edge part)
  23 flange
    23a edge (edge part)
  29 edge bent
30 proximal panel
  30a inner face
  31 web
  32 flange
    32a edge (edge part)
  33 flange
    33a edge (edge part)
40 reinforcing panel
  41 body (of reinforcing panel)
    41a web
    41b flange
    41c flange
  42 extending part (of reinforcing panel)
50 lightening hole (sic)
  51 circular middle lightening hole
  52 oval middle lightening hole
  53 edge lightening hole
60 lightening hole (sic)
  61 edge lightening hole
    61a first edge lightening hole
    61b second edge lightening hole
    61c third edge lightening hole
  62 middle lightening hole
    62a first middle lightening hole
    62b second middle lightening hole
    62c third middle lightening hole
63a, 63b lightening hole on multiplexed panel part
64a, 64b lightening hole on multiplexed panel part
65 connection hole
71, 72 lightening hole
73 installation hole (first installation hole, second installation hole)
80 multiplexed panel part
81 reinforcing overlapping part
84 overlapping panel part
85 (tri-layered) multiplexed part
90 simplex body part
91 engaged overlapping part
92 single panel part
95 equidistance portion
96 lightening hole forming part
100 stiffener (sic)
  101 panel assembly (sic)
  111 base end (sic)
  112 tip (sic)
    112a apex, flat face (sic)
    112b, 112c ridge line (sic)

113 connection (sic)
115 lightening hole (sic)
102 predetermined clearance (sic)
140 reinforcing panel
141*a* web
L1 length of single panel part along longitudinal direction of vehicle
L2 length of overlapping panel part along longitudinal direction of vehicle
P1 load
P2 load
P3 load
C center C of width direction
S installing point S of bracket

The invention claimed is:

1. A structure of an underrun protection bound to a plurality of brackets disposed at a front or a rear portion of a frame of a vehicle, comprising:
a distal panel disposed on a distal side of a longitudinal direction of the vehicle and made of a channel-shaped steel plate is bound to a proximal panel disposed on a proximal side of the longitudinal direction of the vehicle and made of a channel-shaped steel plate at engaged overlapping parts, wherein at each of the engaged overlapping parts an edge of a flange of the distal panel is in contact with an edge of a flange of the proximal panel, and wherein the distal panel and the proximal panel form a hollow having a rectangular closed section defined by a distal face in the longitudinal direction, a proximal face in the longitudinal direction, an upper face, and a lower face; and
a reinforcing panel made of a steel plate disposed at a binder part of the underrun protection and disposed in the hollow;
wherein the underrun protection is bound to a bracket of the plurality of brackets at the binder part and wherein the reinforcing panel is in contact with an inner face of one of the proximal panel and the distal panel and is in contact with the engaged overlapping parts such that the structure has a multiplexed panel part formed of three or more overlapping panels.

2. The structure according to claim 1, wherein:
the upper face and the lower face at the binder part each have a single panel part formed only of the distal panel or the proximal panel at a portion toward one of the distal side and the proximal side in the longitudinal direction of the vehicle; and
the upper face and the lower face each have an overlapping panel part formed of a plurality of panels toward the other one of the distal side and the proximal side in the longitudinal direction of the vehicle.

3. The structure according to claim 2, wherein the single panel parts have lengths in the longitudinal direction of the vehicle equal to or shorter than lengths of the respective overlapping panel parts.

4. The structure according to claim 1, wherein:
the reinforcing panel is connected to the inner face of the proximal panel so as to be in contact with the inner face;
the reinforcing panel has a first installation hole and the proximal panel has a second installation hole, the first installation hole overlapping the second installation hole; and
a fastening member fixes the reinforcing panel and the proximal panel to the bracket through the first installation hole and the second installation hole.

5. The structure according to claim 1, wherein:
the reinforcing panel has a web and flanges in contact with an inner face of a web and the flanges of the proximal panel, respectively; and
the flanges of the distal panel, the proximal panel and the reinforcing panel have respective lengths in the longitudinal direction of the vehicle longer in decreasing order of length.

6. The structure according to claim 1, wherein the distal panel, the proximal panel and the reinforcing panel are steel plates of a same material and a same thickness.

* * * * *